United States Patent
Saigusa

(10) Patent No.: US 9,715,359 B2
(45) Date of Patent: Jul. 25, 2017

(54) INFORMATION PROCESSING APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventor: Hirokazu Saigusa, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/956,682

(22) Filed: Dec. 2, 2015

(65) Prior Publication Data
US 2016/0162235 A1   Jun. 9, 2016

(30) Foreign Application Priority Data

Dec. 5, 2014  (JP) .................. 2014-247107
May 21, 2015  (JP) .................. 2015-103652

(51) Int. Cl.
*H04N 1/04* (2006.01)
*G06F 3/12* (2006.01)

(52) U.S. Cl.
CPC .......... *G06F 3/1256* (2013.01); *G06F 3/1205* (2013.01)

(58) Field of Classification Search
CPC .................. G06F 3/1256; G06F 3/1205
USPC ................. 358/1.15, 1.9, 1.14, 1.13
See application file for complete search history.

(56) References Cited

U.S. PATENT DOCUMENTS 8,422,044 B2   4/2013  Miyashita
2010/0238499 A1*  9/2010  Wakui ............ G06F 3/1204
                                                    358/1.15

FOREIGN PATENT DOCUMENTS

JP   2008-009901 A   1/2008

* cited by examiner

*Primary Examiner* — Houshang Safaipour
(74) *Attorney, Agent, or Firm* — Carter, DeLuca, Farrell & Schmidt, LLP

(57) ABSTRACT

An information processing apparatus includes a manager setting application configured to perform a manager setting requiring an input to a predetermined item of a print setting; a first print setting application executed on a first execution environment; and a second print setting application executed on a second execution environment. If the manager setting application performs the manager setting requiring the input to the predetermined item of the print setting and there is no input to the predetermined item requiring the input, the first print setting application and the second print setting application display a screen for prompting the input to the predetermined item.

11 Claims, 32 Drawing Sheets

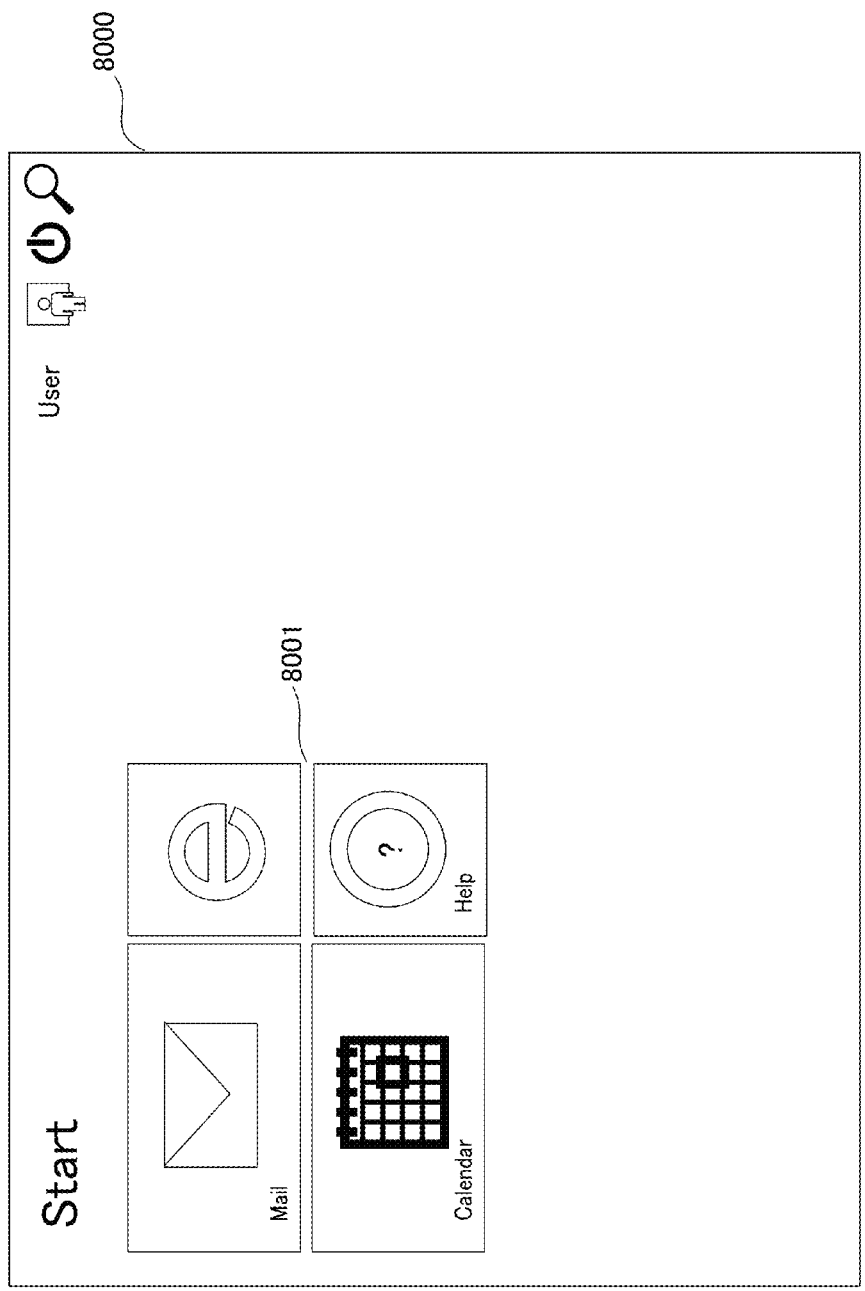

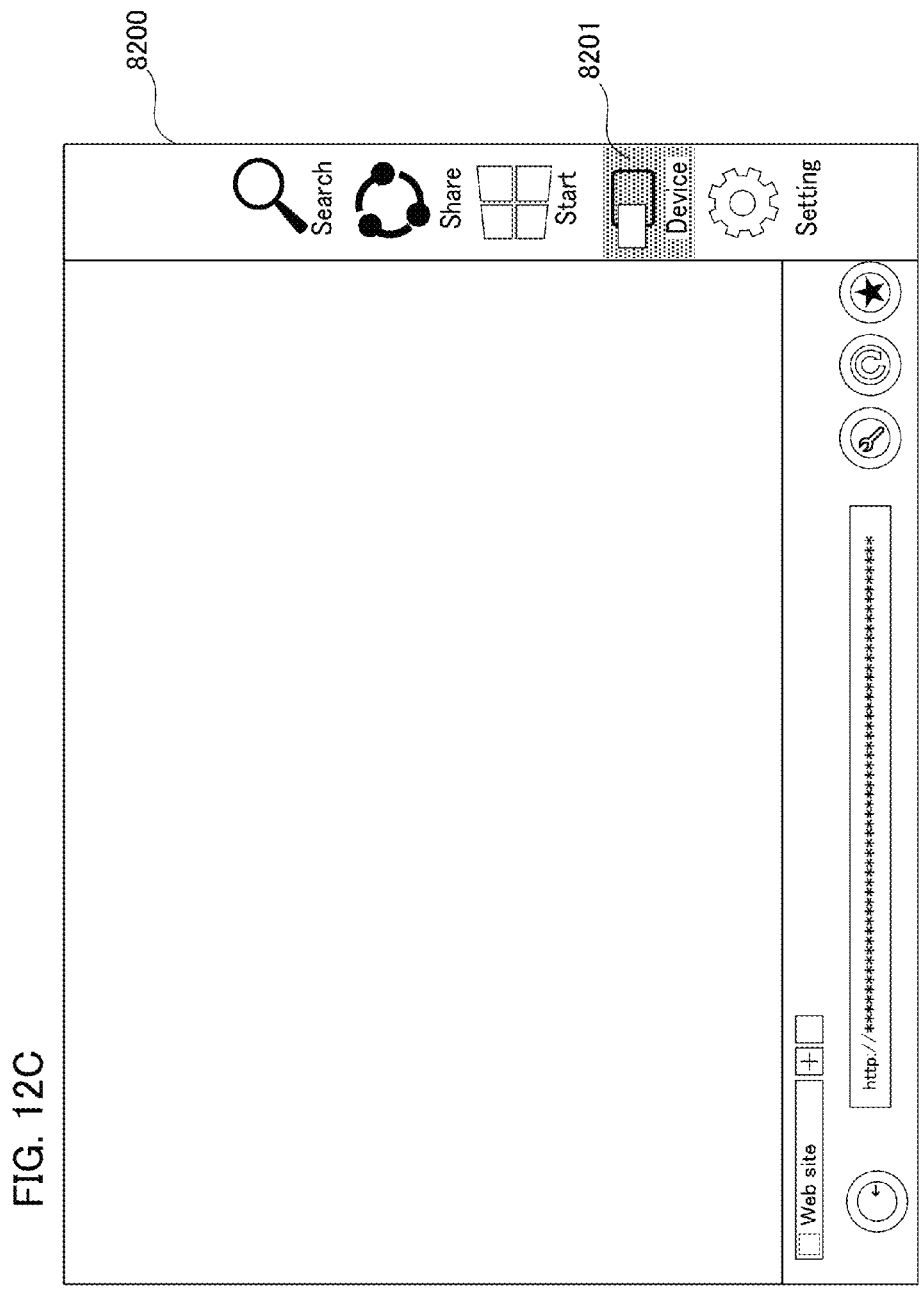

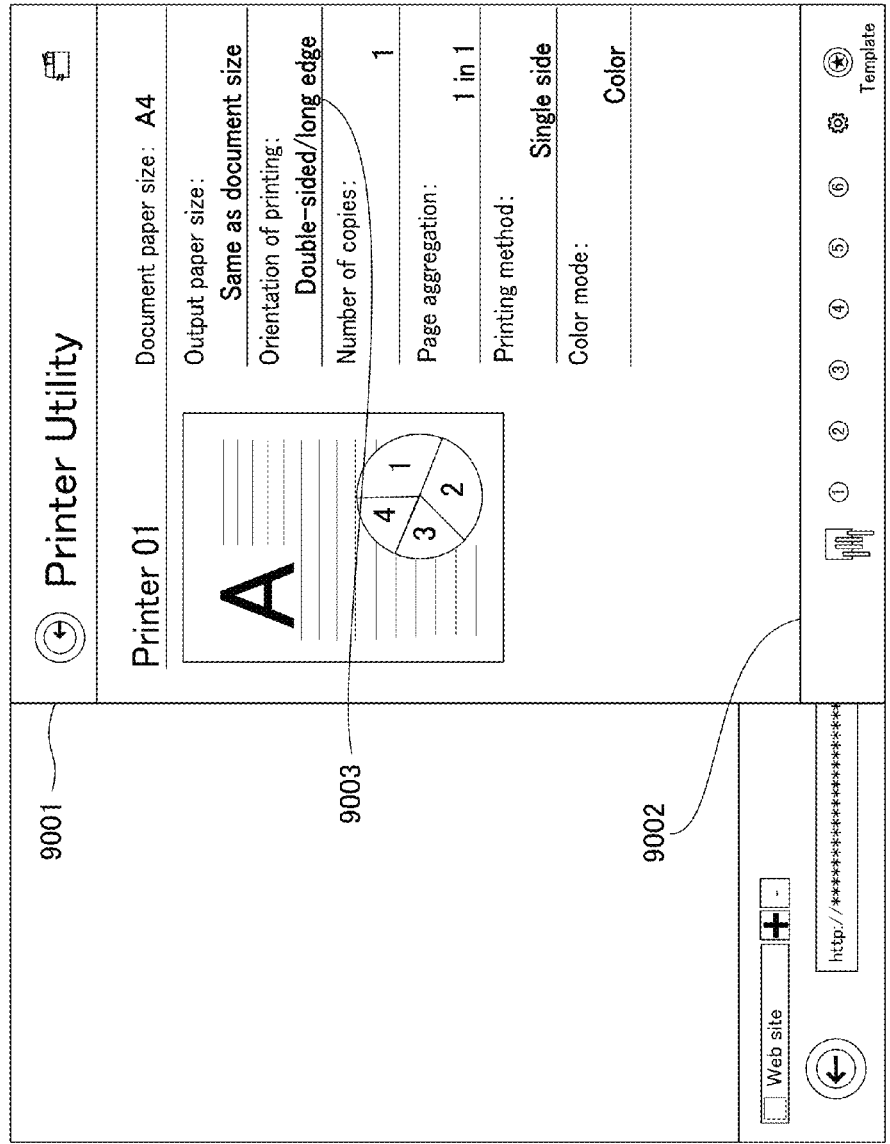

INFORMATION PROCESSING APPARATUS, METHOD OF CONTROLLING INFORMATION PROCESSING APPARATUS, AND STORAGE MEDIUM

BACKGROUND OF THE INVENTION

Field of the Invention

The present invention relates to an information processing apparatus, a method of controlling the information processing apparatus, and a storage medium.

Description of the Related Art

Japanese Patent Laid-Open No. 2008-9901 discloses a print control method of displaying a reason for unavailability as a message by asking a device the reason for the unavailability if the user desires to set the unavailable item.

SUMMARY OF THE INVENTION

During printing, a manager can set a manager setting capable of being set in a print setting application for the manager if the manager wishes to limit the use of a normal print setting. For example, the manager sets a function of requesting a user to input a password during the printing through the manager setting, thereby displaying a password input screen to force the user to input the password during the printing. Specifically, if the function of requesting the password input is set through the manager setting, a printer driver displays the password input screen during the printing and transmits the input password to the device to execute the printing only if the device approves the password. Further, a driver user interface (UI) can prompt the user to input the password by displaying that the input of the password is forgotten in a popup during the printing. Further, an operating system (OS) having a touch panel UI specific to a touch panel operation in addition to a desktop UI based on a mouse operation has recently been known. In order to provide a print setting UI to each UI environment of this OS, it is necessary to develop and provide a module for an individual print setting UI corresponding to each UI environment.

However, if the information processing apparatus includes two UIs including a desktop UI and a touch panel UI, the manager setting set in one UI is not reflected in the other UI. Further, the recent driver UI does not display an input screen of a password or the like during printing and it is difficult to execute the printing because an item for which an input is necessary is not recognized if a function of requesting a password input in the manager setting unintended by the user or the like is set.

The present invention provides an information processing apparatus in which a manager setting is shared between a desktop UI and a touch panel UI and a popup for prompting an input is displayed for an item requiring an input to be set through the manager setting.

According to the present invention, an information processing apparatus is provided that includes a manager setting application configured to perform a manager setting requiring an input to a predetermined item of a print setting; a first print setting application executed on a first execution environment; and a second print setting application executed on a second execution environment, wherein, if the manager setting application performs the manager setting requiring the input to the predetermined item of the print setting and there is no input to the predetermined item requiring the input, the first print setting application and the second print setting application display a screen for prompting the input to the predetermined item.

According to the present invention, an information processing apparatus in which a manager setting is shared between a desktop UI and a touch panel UI and a popup for prompting to enter an input is displayed for an item requiring an input to be set through the manager setting can be provided. Accordingly, the manager setting can be reflected in both the desktop UI and the touch panel UI by saving the set manager setting so that the set manager setting can be shared. Further, it is possible to display a popup for prompting the user to enter an input to an item requiring the input on a screen and prevent the input from being forgotten if any UI of the desktop UI and the touch panel UI is used.

Further features of the present invention will become apparent from the following description of exemplary embodiments (with reference to the attached drawings).

BRIEF DESCRIPTION OF THE DRAWINGS

FIGS. 12A to 12C are diagrams illustrating examples of a screen of a touch panel application.

FIGS. 14A and 14B are diagrams illustrating examples of a touch panel print detail setting application screen.

DESCRIPTION OF THE EMBODIMENTS

Hereinafter, preferred embodiments of the invention will be described with reference to the drawings.

First Embodiment

Figure 1:
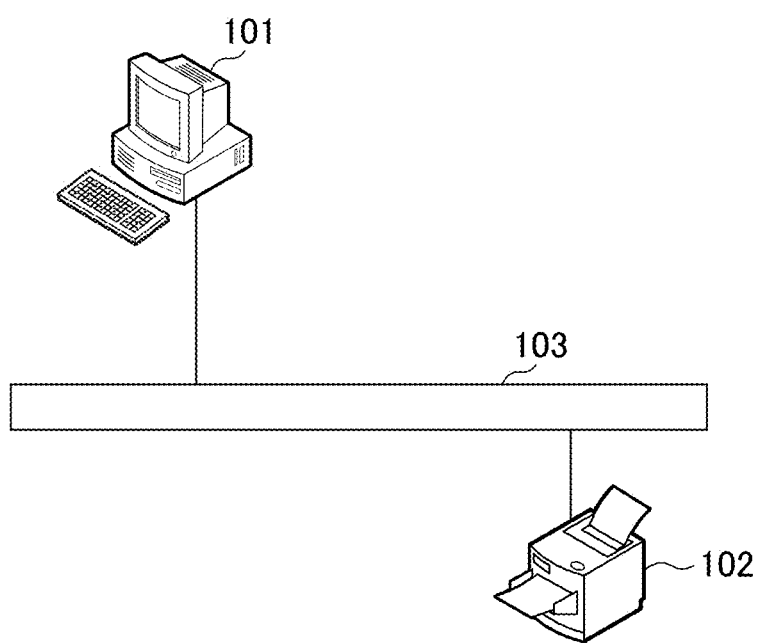
FIG. 1 is a diagram illustrating a configuration of the entire system according to an embodiment of the present invention.

FIG. 1 is a diagram illustrating a configuration of the entire system to which an information processing apparatus according to the present embodiment is connected. The system illustrated in FIG. 1 includes a client computer 101 connected to be capable of communicating via a network 103 and a printer 102 capable of receiving print data of a page description language (PDL) format and performing printing. The network 103 is a base connected to an external network and used to perform communication between devices and may be a wired or wireless local area network (LAN), the Internet, or the like. In addition, the printer 102 may be a single-function printer including only a print function or a multi-function printer (MFP) having a print function, a scan function, and a copy function.

Figure 2:
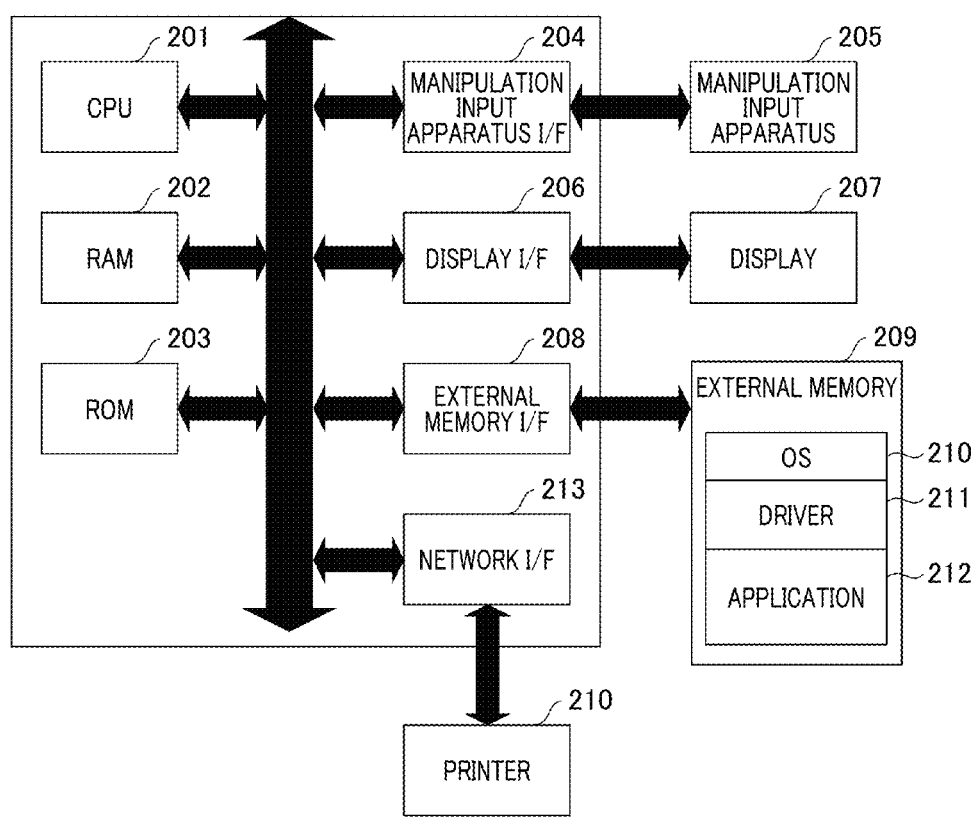
FIG. 2 is a diagram illustrating a configuration of hardware of a client computer.

FIG. 2 is a block diagram illustrating a hardware configuration of a client computer 101 according to this embodiment. The client computer 101 includes a central processing unit (CPU) 201 for controlling a process of the present invention, a random access memory (RAM) 202 for providing a work area of the CPU, and a read only memory (ROM) 203. Further, the client computer 101 is constituted of a operation input apparatus interface (I/F) 204, a display I/F 206, an external memory I/F 208, and a network I/F 213.

The CPU 201 controls each device connected to a system bus according to a program stored in the RAM 202. Also, the client computer 101 includes at least one CPU 201. In addition, the RAM 202 functions as a main memory, a work area, or the like of the CPU 201. Then, the ROM 203 stores various types of programs and data. Further, a boot program, a program for storing a basic input/output system (BIOS), or the like is written.

The operation input apparatus I/F 204 controls the operation input apparatus 205 such as a keyboard, a pointing device (mouse), or a touch UI. The display I/F 206 controls the screen display of a display (display unit) 207. In addition, the external memory I/F 208, for example, controls access to the external memory 209 such as a hard disk (HD) or a solid state disk (SSD).

The external memory 209 stores an OS 210, various types of applications 212, a driver 211 including a printer driver, various types of files, and the like, and functions as a computer-readable storage medium. The network I/F 213 is connected to the printer 102 via the network 103 and performs a communication control process with the printer 102.

Figure 3:
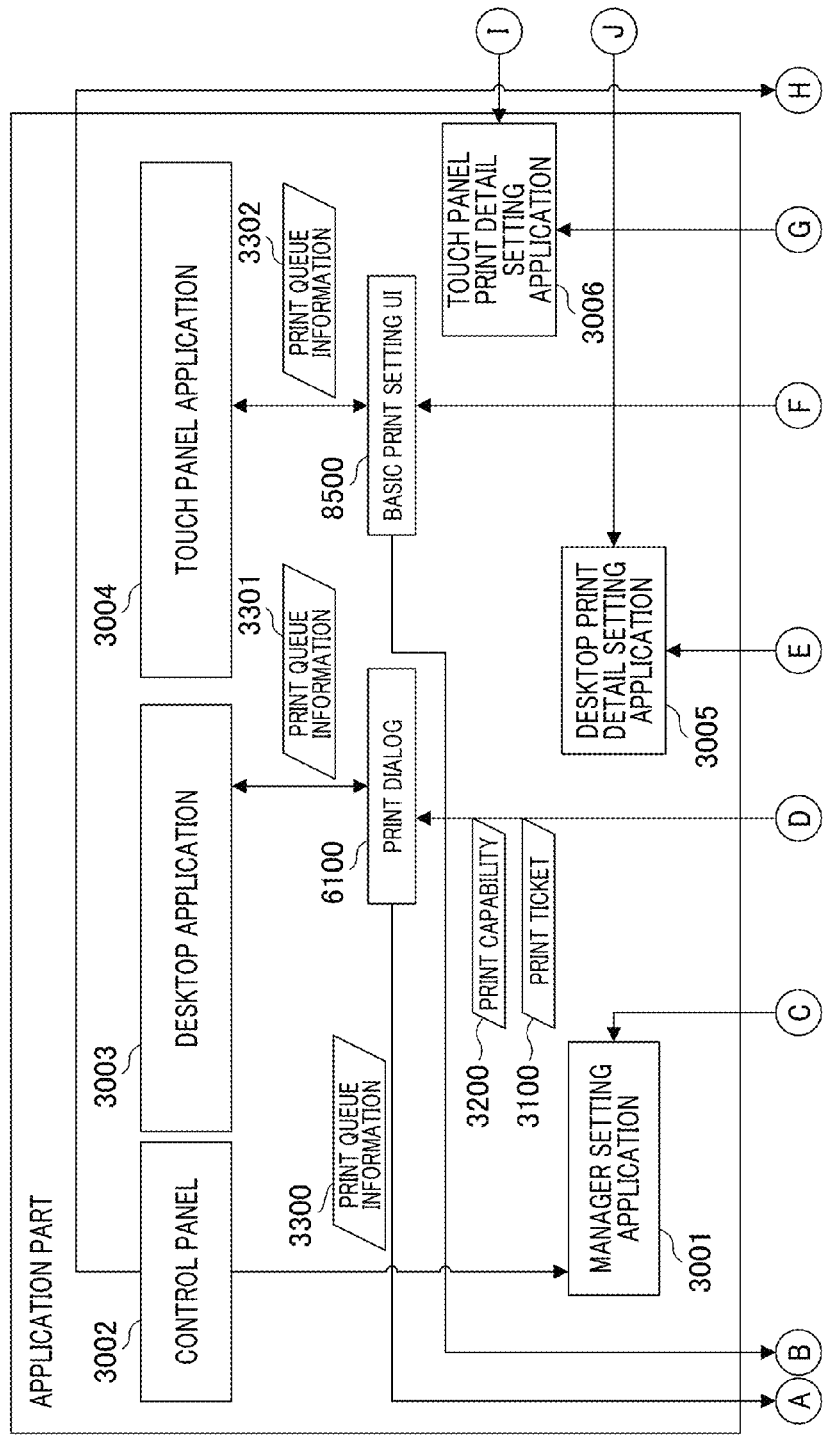
FIG. 3 is a diagram illustrating an application part to be operated by an OS.
Figure 4:
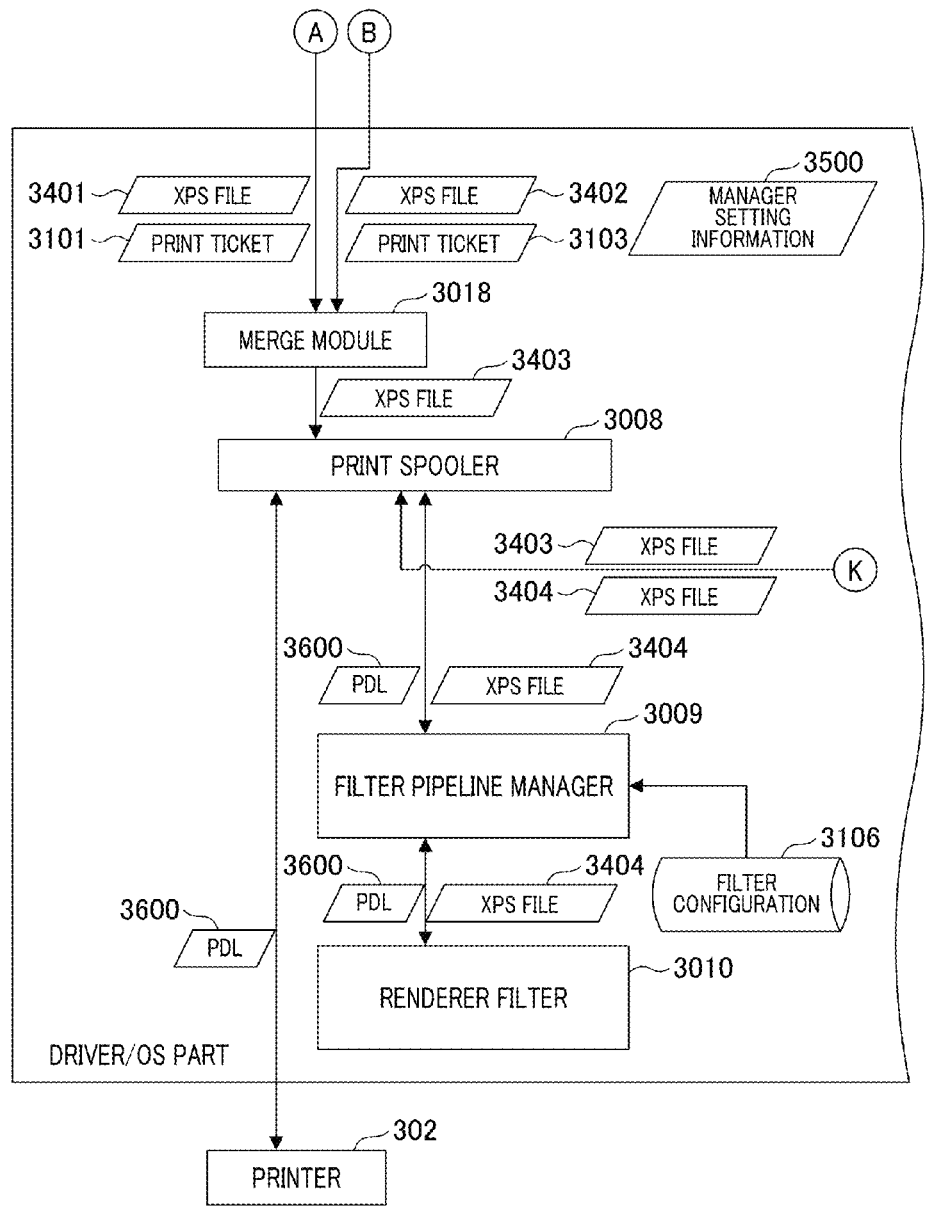
FIG. 4 is a diagram illustrating a driver/OS part to be operated by the OS.
Figure 5:
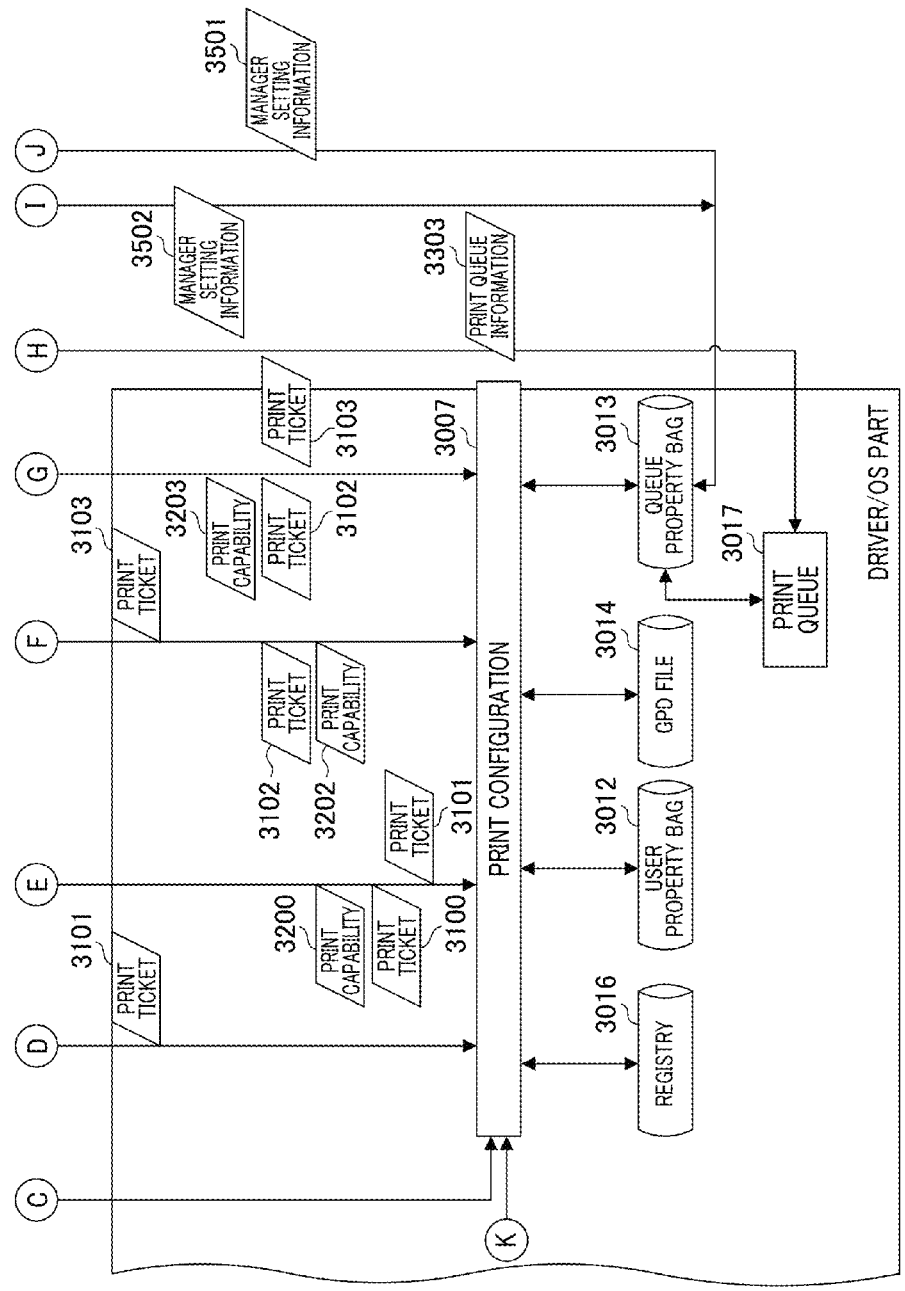
FIG. 5 is a diagram illustrating the driver/OS part to be operated by the OS.

FIGS. 3, 4, and 5 are diagrams illustrating configurations of an application and a driver to be operated by the OS 210. Here, a basic process of printing will be described using FIGS. 3, 4 and 5. FIG. 3 is a diagram illustrating an application part capable of being directly operated by the user. FIGS. 4 and 5 are diagrams illustrating a driver/OS part to be controlled by the OS 210 according to a request from the application. Note that the application and the module illustrated in FIGS. 3, 4, and 5 are stored in the external memory 209, loaded to the RAM 202 if necessary, and executed by the CPU 201 on the client computer 101.

Here, in the present embodiment, a manager setting process, a print process from the desktop, a print process from the touch panel, and a print process of a driver/OS layer into which a process is divided will be described. First, the manager setting process will be described. The manager setting process is a process of changing manager setting information 3500. A manager setting application 3001 illustrated in FIG. 3 is an application for setting manager setting information 3500 of the printer 102 illustrated in FIG. 4 such as settings of validity and invalidity of a sector-specific management function.

First, the manager setting application 3001 is activated according to the user's request from a control panel 3002 for handling the overall management of the computer. If the manager setting application 3001 is activated, the control panel 3002 transfers print queue information 3300 to the OS 210 and requests the creation of an instance of the manager setting application 3001 corresponding to the print queue information 3300.

Next, a print queue 3017 illustrated in FIG. 5 is a system associated with the printer 102. The print queue 3017 manages a print job generated according to a request of an application during printing. In addition, the print queue 3017 is associated with an individually corresponding queue property bag 3013. Next, the manager setting application 3001 requests the OS 210 to set the manager setting information 3500 according to the user's operation. Then, the OS 210 edits the manager setting information 3500 of the queue property bag 3013 through a print configuration 3007. Note that the manager setting information 3500 of this embodiment is saved in the queue property bag 3013. In addition, the saved manager setting information 3500 can be shared between two or more different types of display forms.

Next, the print process from the desktop UI will be described. The print process from the desktop UI is a process until data of a printing target is transferred from the desktop application 3003 to the driver/OS layer. The desktop application 3003 illustrated in FIG. 3 has a print (setting) dialog 6100 which is a basic UI for printing corresponding to a print queue 3017. First, the desktop application 3003 displays the print dialog 6100 associated with the print queue information 3301 during printing according to the user's request. The print dialog 6100 requests the OS 210 to provide a print capability 3200 and a print ticket 3100 to display a simple print setting UI during display.

The desktop print detail setting application 3005 illustrated in FIG. 3 is a print detail setting application activated according to the user's request from the print dialog 6100. The desktop print detail setting application 3005 displays a list of functions of various types of drivers 211 and changes a detailed print setting from the desktop application 3003. In addition, the desktop print detail setting application 3005 during activation requests the OS 210 to provide the print ticket 3100 and the print capability 3200 used in the print dialog 6100. Then, the manager setting information 3501 is acquired by accessing the queue property bag 3013.

Then, the change of the print setting or the display of the list of the drivers 211 is performed according to the print ticket and the print capability. The print ticket is print setting data created in a markup language and the print setting can be changed by changing a value. The print capability is data of a list of print settings capable of being set by the driver 211 and is generated in the markup language as in the print ticket. Then, the OS 210 transfers the print ticket 3100 and the print capability 3200 to the desktop print detail setting application 3005 via the print configuration 3007.

In addition, the print configuration 3007 illustrated in FIG. 5 reads data from a generic printer description (GPD) file 3014, a user property bag 3012, a registry 3016, and a queue property bag 3013 and creates the print ticket and the print capability. In addition, conflict processing for setting an invalid print setting to a valid setting is also performed in the creation process.

In addition, in data fields of the user property bag 3012, the registry 3016, the queue property bag 3013, and the GPD file 3014 illustrated in FIG. 5, a print setting of a user default, user-specific data, and manager setting information 3501 are saved. In addition, data such as the list of functions of the driver or the list of combinations of invalid settings is saved.

Next, the desktop print detail setting application 3005 generates a UI based on the print capability 3200 and the print ticket 3100 and receives the user's operation. After the reception of the user's operation is completed, the desktop print detail setting application 3005 establishes the print setting and transfers the print ticket 3101 which is the established print setting to the OS 210.

Next, the OS 210 performs the conflict processing on the established print ticket 3101 in the print configuration 3007 and transfers the print ticket 3101 on which the conflict processing is performed to the print dialog 6100. Then, the print dialog 6100 receives a print event according to the user's operation and transfers the print ticket 3101 and an XPS file 3401 to be printed to a merge module 3018.

Next, the print process from the touch panel UI will be described. The print process from the touch panel is a print process until data of a print target is transferred from a touch panel application 3004 to the driver/OS layer. The touch panel application 3004 holds a basic print setting UI 8500 which is a basic UI for printing corresponding to a print queue 3017 and displays the basic print setting UI 8500 associated with the print queue information 3302 during printing according to the user's request. The basic print setting UI 8500 requests the OS 210 to provide the print capability 3202 and the print ticket 3102 during display and displays a simple print setting UI.

The touch panel print detail setting application 3006 illustrated in FIG. 3 is a print detail setting application to be activated according to the user's request from the basic print setting UI 8500. Then, the display of the list of functions of the various types of drivers 211 and the change of the detailed print setting are performed from the touch panel application 3004.

The touch panel print detail setting application 3006 requests the OS 210 to create the print ticket 3102 and the print capability 3203 during activation. The OS 210 generates the print ticket 3102 and the print capability 3203 as in the flow of the print process from the desktop. Then, the touch panel print detail setting application 3006 acquires the manager setting information 3502 by accessing the queue property bag 3013.

Next, the touch panel print detail setting application 3006 generates a UI based on the print capability 3203 and the print ticket 3102 and receives the user's operation. After the reception of the user's operation is completed, the touch panel print detail setting application 3006 establishes the print setting and transfers the print ticket 3103 which is the established print setting to the OS 210.

Then, after the OS 210 performs the conflict processing on the established print ticket 3103 in the print configuration 3007, the print ticket 3103 is transferred to the basic print setting UI 8500. The basic print setting UI 8500 receives a print event in the user's operation and transfers the print ticket 3103 and an XPS file 3402 which is a print target to the merge module 3018.

Next, a print process of the driver/OS layer will be described. This process is a process in which the XPS file and the print ticket are received from the desktop application 3003 and the touch panel application 3004 and a PDL 3600 is generated and transferred to the printer 302.

The merge module 3018 illustrated in FIG. 4 generates an XPS file 3403 of the print target by coupling the print ticket and the XPS file transferred from each application. Then, the merge module 3018 adds the print ticket which is the print setting to the XPS file 3403. Next, the merge module 3018 transfers the XPS file 3403 to the print configuration 3007 and performs conflict processing. Also, the XPS file is created in the markup language.

Next, the OS 210 acquires an XPS file 3404 on which the conflict processing has been performed from the print configuration 3007 and transfers the XPS file 3404 to the filter pipeline manager 3009. Also, the filter pipeline manager 3009 is a module having a function of calling a module called a filter and generates the PDL 3600 from the XPS file 3404 through the filter.

In the filter configuration 3106, the filter called by the filter pipeline manager 3009 is described in the markup language and the necessary filter is called according to the description. In the present embodiment, the filter pipeline manager 3009 calls a renderer filter 3010. Next, a print spooler 3008 acquires the PDL 3600 from the filter pipeline and transfers the PDL 3600 to the OS 210. Then, the OS 210 transfers the PDL 3600 to the printer 102, so that printing is performed.

Figure 24:
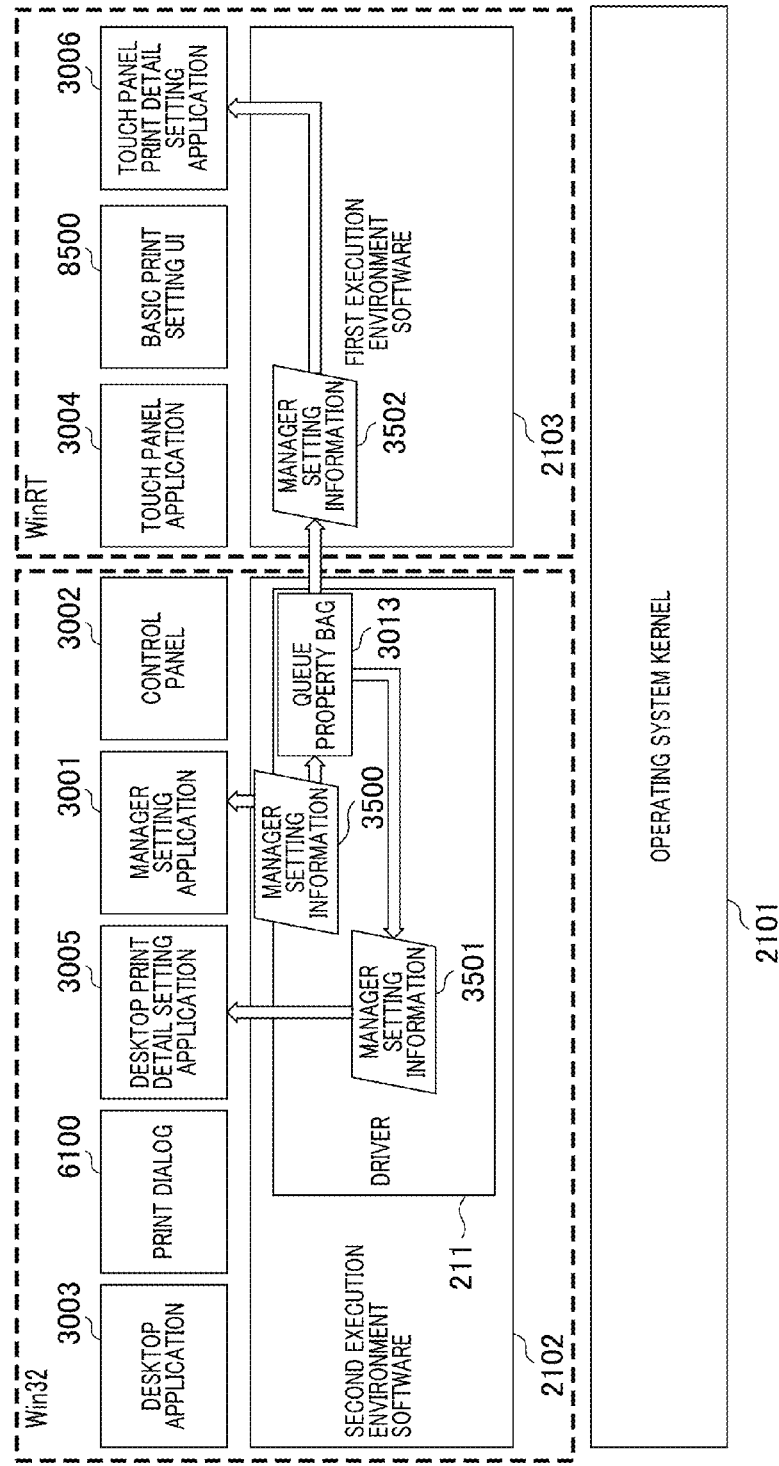
FIG. 24 is a diagram illustrating a configuration of two execution environments.

Here, each application and the manager setting information will be described using FIG. 24. FIG. 24 is a diagram illustrating configurations of an execution environment of the touch panel application 3004 and an execution environment of the desktop application 3003. The touch panel application 3004, the basic print setting UI 8500, and the touch panel print detail setting application 3006 are executed on first execution environment software 2103 (WinRT).

On the other hand, the desktop application 3003, the print dialog 6100, and the desktop print detail setting application 3005 are executed on second execution environment software 2102 (Win32). In addition, the manager setting application 3001 and the control panel 3002 are also executed on the second execution environment software 2102. Both of the execution environments are executed on an OS kernel 2101. Also, the OS 210, the first execution environment software 2103, the second execution environment software 2102, and the OS kernel 2101 are assumed to be integrated.

The first execution environment software 2103 is an application programming interface (API) group for the touch panel application 3004 called Windows (registered trademark) Store Apps, and is executed if the touch panel application 3004 is executed. The first execution environment software 2103 supports a plurality of languages such as C# and C++. The touch panel application 3004 analyzes metadata defined in a common language interface (CLI) which is an intermediate language for a plurality of languages for a compile time. Thereby, it is possible to call an API of the first execution environment software 2103 from a plurality of languages.

The second execution environment software 2102 is an API group for executing the desktop application 3003 and is called from an unmanaged code including C++. The API of Win32 is defined within a dynamic link library (DLL) and an application on Win32 including the desktop application 3003 executes an API of Win32 by calling the DLL during execution.

As shown in the description using FIG. 5, the manager setting application 3001 acquires and edits manager setting information 3500. The desktop print detail setting application 3005 and the touch panel print detail setting application 3006 read and use the manager setting information 3501 and the manager setting information 3502, respectively. The manager setting information 3500, the manager setting information 3501, and the manager setting information 3502 are only handled by different applications and are the same information. Note that the manager setting information 3500, the manager setting information 3501, and the manager setting information 3502 have substantially the same content, and, for example, may be configured to be different in a description method or configured to include additional information only in specific manager setting information.

With the configuration described above, it is possible to control the popup of the touch panel print detail setting application 3006 of the first execution environment and the desktop print detail setting application 3005 of the second execution environment by merely performing the setting in the manager setting application 3001. Specifically, if a sector-specific management setting item 5007 or a secure print setting item 5008 is validated in the manager setting application 3001, its setting is saved in the manager setting information 3500.

Figure 11:
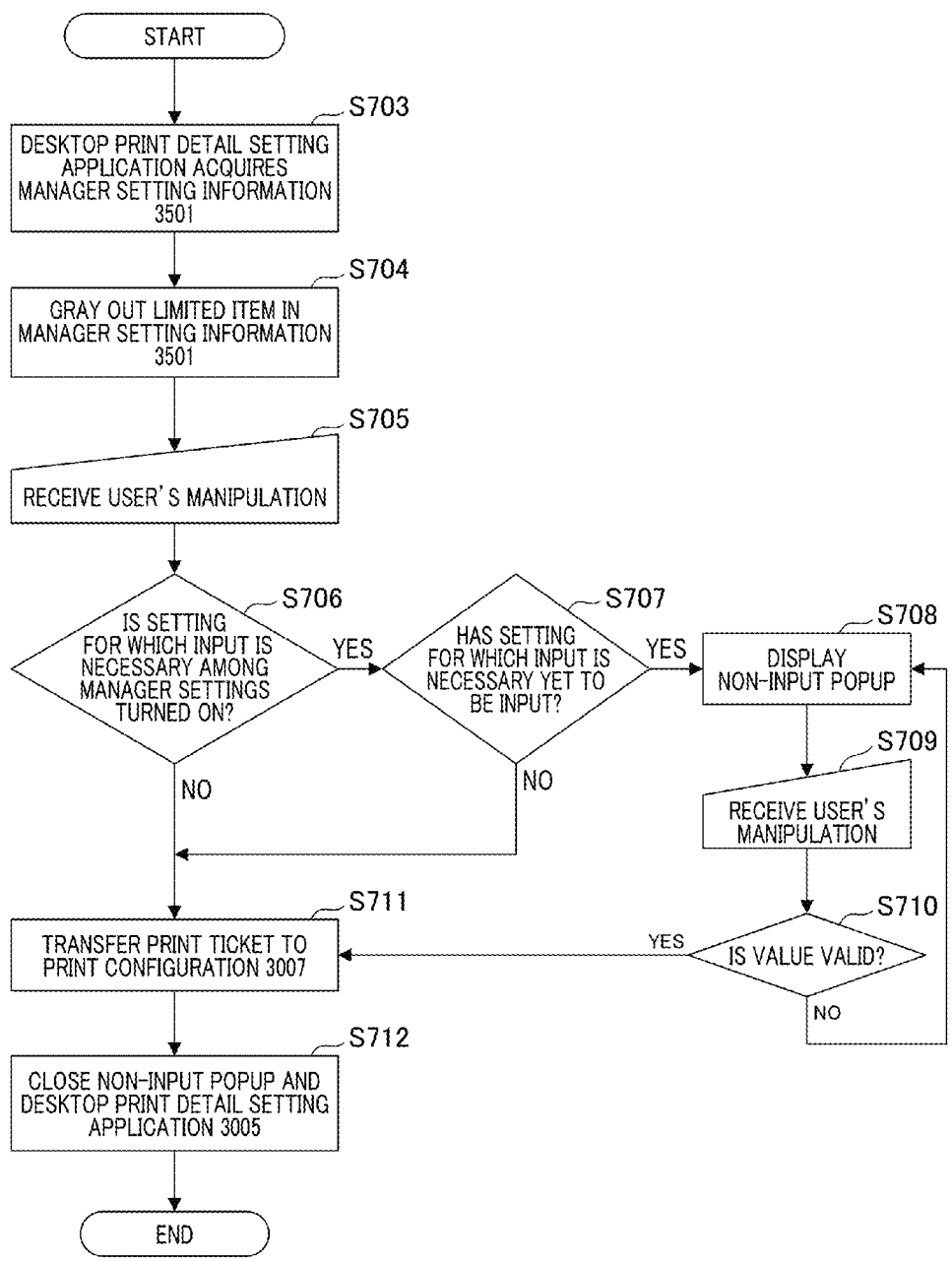
FIG. 11 is a flowchart illustrating a desktop print detail setting process.
Figure 16:
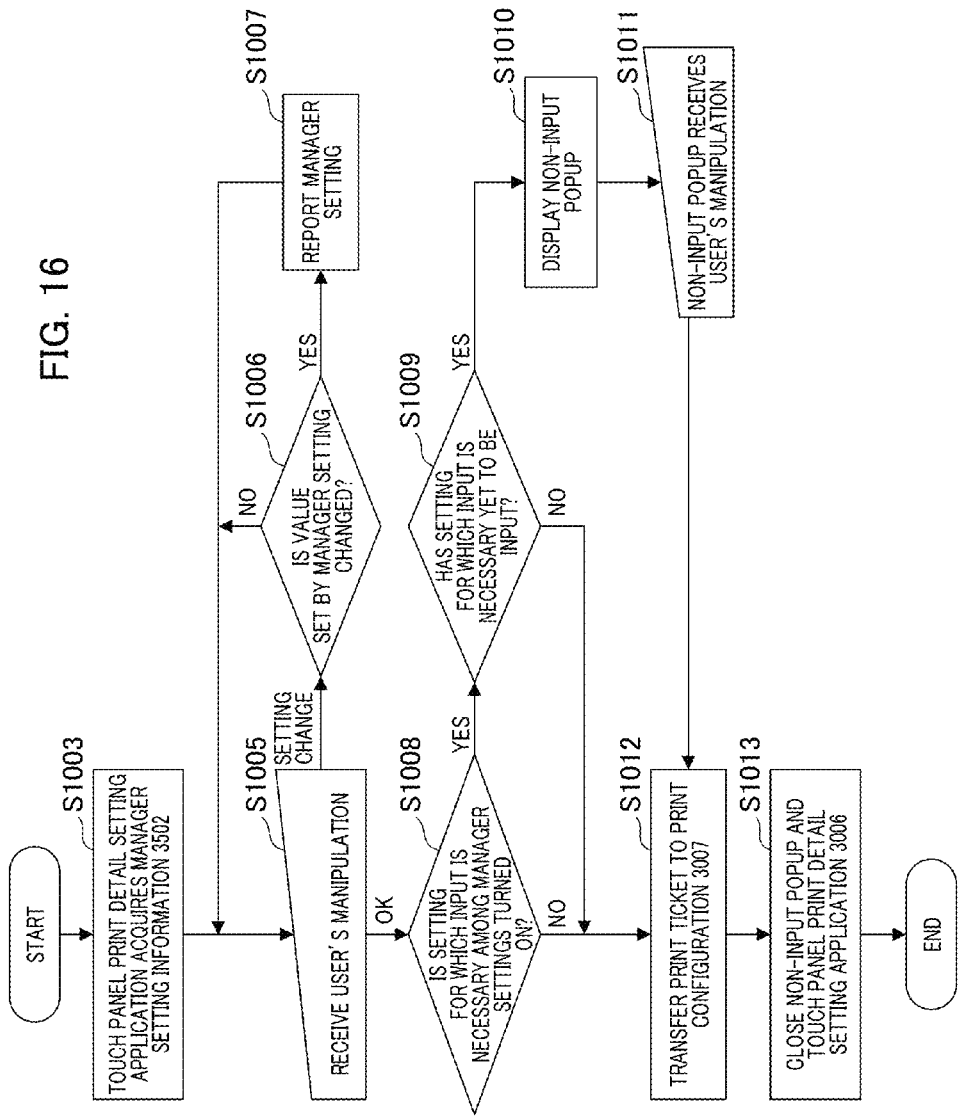
FIG. 16 is a flowchart illustrating a process of touch panel print detail setting.

As described above, the touch panel print detail setting application 3006 and the desktop print detail setting application 3005 read the manager setting information 3501 and 3502 having the same information. Then, according to the setting of the manager setting application 3001, the popup of the touch panel print detail setting application 3006 of step S708 illustrated in FIG. 11 is displayed. In addition, the popup of the desktop print detail setting application 3005 of step S1010 illustrated in FIG. 16 is displayed.

Figure 6:
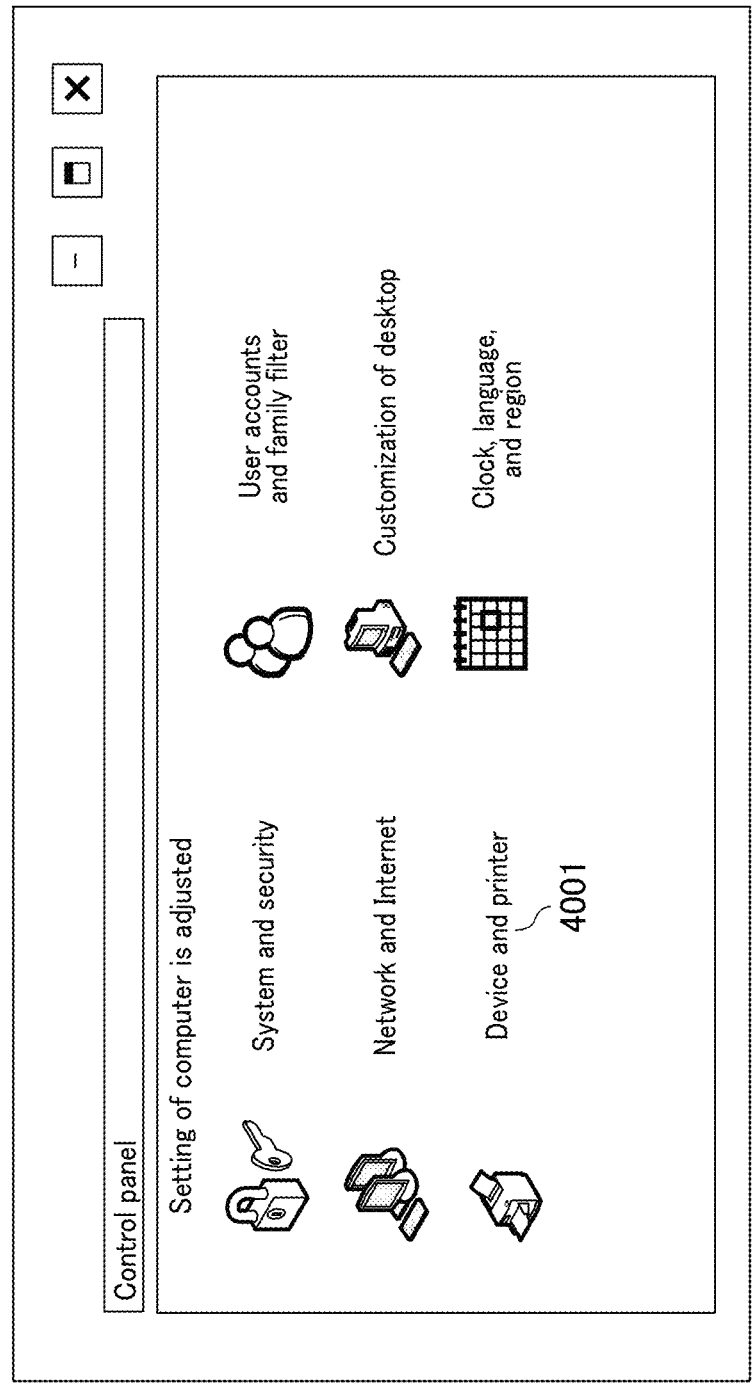
FIG. 6 is a diagram illustrating an example of a control panel screen.
Figure 7:
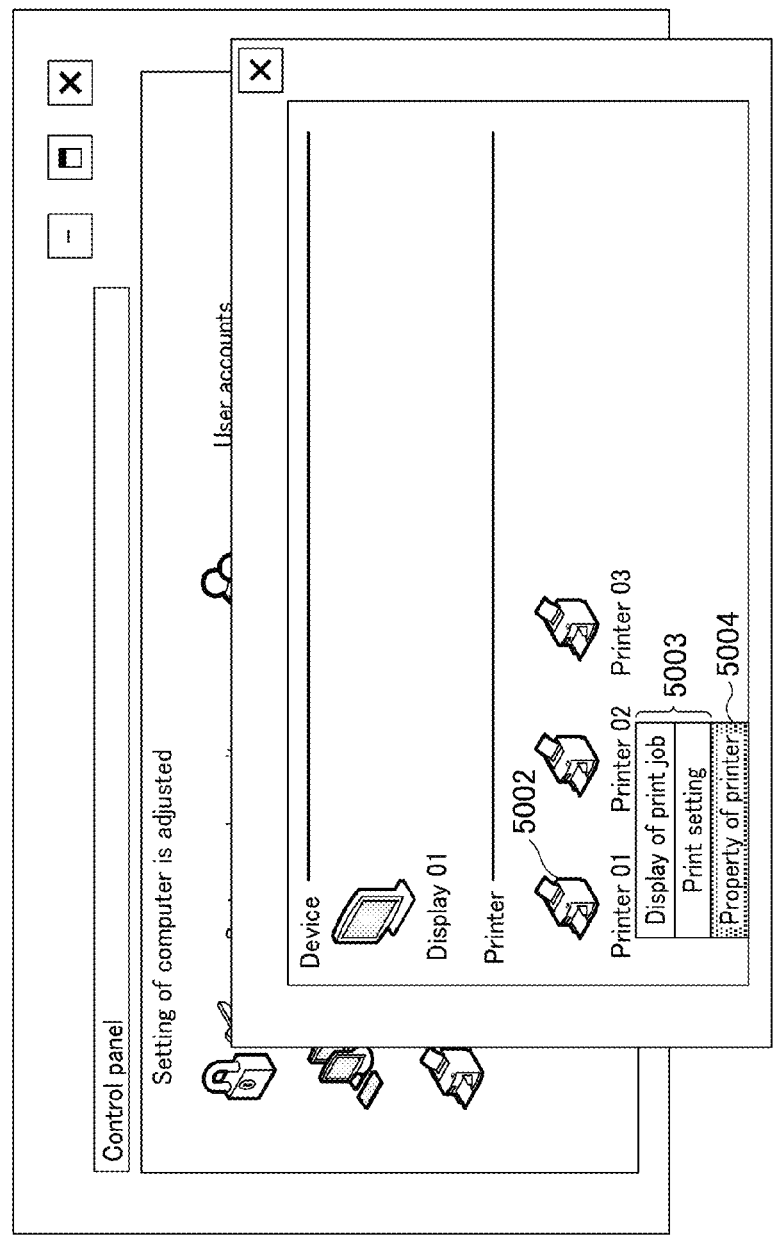
FIG. 7 is a diagram illustrating an example of a device and a printer screen.
Figure 8:
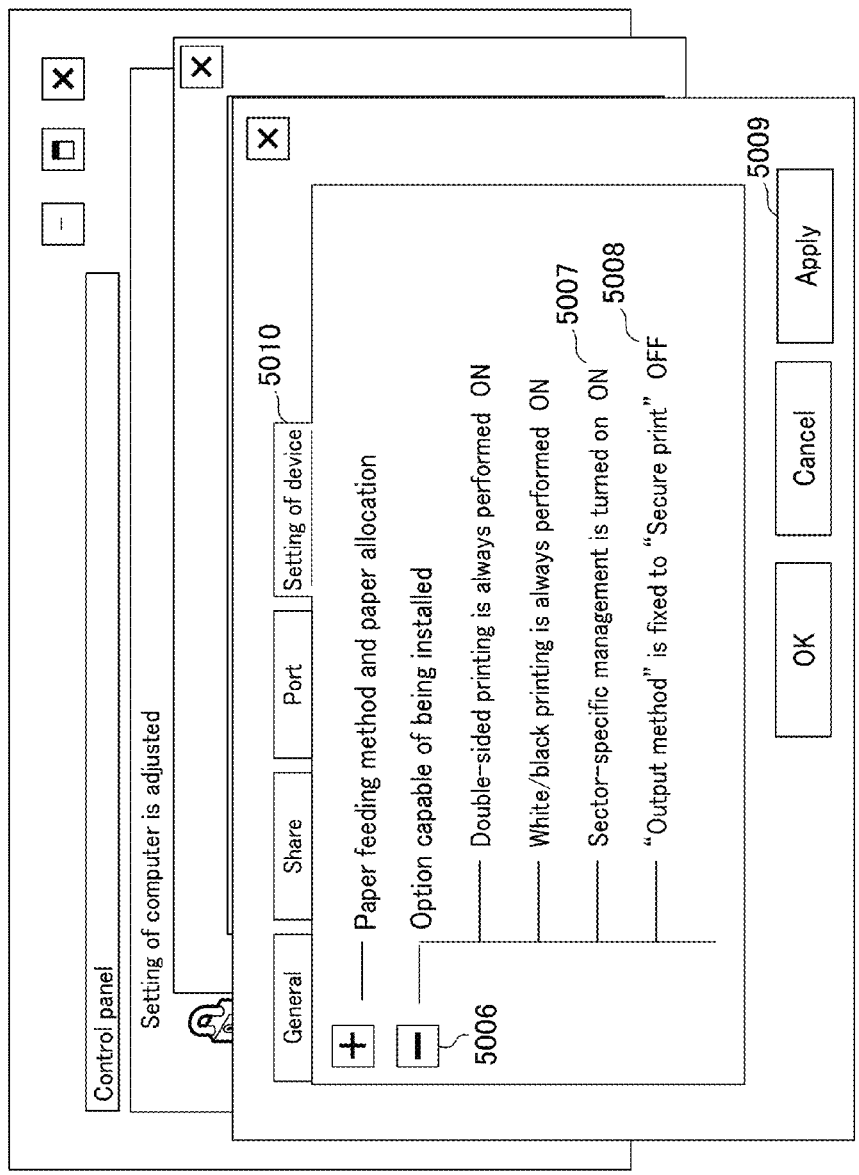
FIG. 8 is a diagram illustrating an example of a manager setting application screen.

FIGS. 6, 7, and 8 are diagrams illustrating examples of the manager setting application 3001 which operates on the OS 210. FIG. 6 is a diagram illustrating the control panel 3002 for allowing the user to perform settings of the computer. The control panel 3002 is an application to operate on the desktop, and displays buttons classified according to a category in order to perform various settings including the setting of the printer 102. The device and printer 4001 correspond to a button of a category of the device and the printer and a device and printer screen is displayed if the button is clicked.

FIG. 7 is a diagram illustrating the device and printer screen. The device and printer screen displays a list of devices or printers 102 recognized by the OS 210 through the operation input apparatus I/F 204, the display I/F 206, the network I/F 213, and the like. In addition, an icon 5002 of printer 01 illustrated in FIG. 7 indicates a print queue 3017 and is clicked to display a printer menu 5003. Then, a property 5004 of the printer is an item of the printer menu 5003 for displaying a manager setting screen. The control panel 3002 displays the manager setting screen corresponding to the print queue 3017 selected in the device and printer screen by receiving an input of a printer menu button.

FIG. 8 is a diagram illustrating an example of the manager setting application 3001. The manager setting application 3001 displays the manager setting information 3500 after classifying the manager setting information 3500 into a plurality of tabs for every purpose. In a setting tab 5010 of the device, a list of functions of installing a function capable of being added to the device is compiled. A function list button 5006 for displaying a list of functions capable of being added is disposed in the setting tab 5010 of a device. The manager setting application 3001 displays the list of functions capable of being added to the device by receiving the click of the function list button 5006.

Next, a sector-specific management setting item 5007 is one of the functions capable of being added and is used to perform switching between validity and invalidity of the sector-specific management function. If the sector-specific management function is valid, the setting of the sector-specific management function of the print queue is valid. Note that the sector-specific management function is a function of requesting inputs of a sector ID and a password during printing. That is, if the sector-specific management function of the sector-specific management setting item 5007 is valid, the sector ID and the password become items (essential input items) for which an input is necessary.

The secure print setting item 5008 is used to perform switching between validity and invalidity of the secure print by changing the secure print setting item. Also, the secure print is a function of requesting the password during the printing. Then, if the manager setting application 3001 receives the click of an application button 5009, the OS 210 writes the manager setting information 3500 to the queue property bag 3013. That is, if the secure print is valid in the secure print setting item 5008, the password of the secure print becomes an item (essential input item) for which an input is necessary.

Figure 9A:
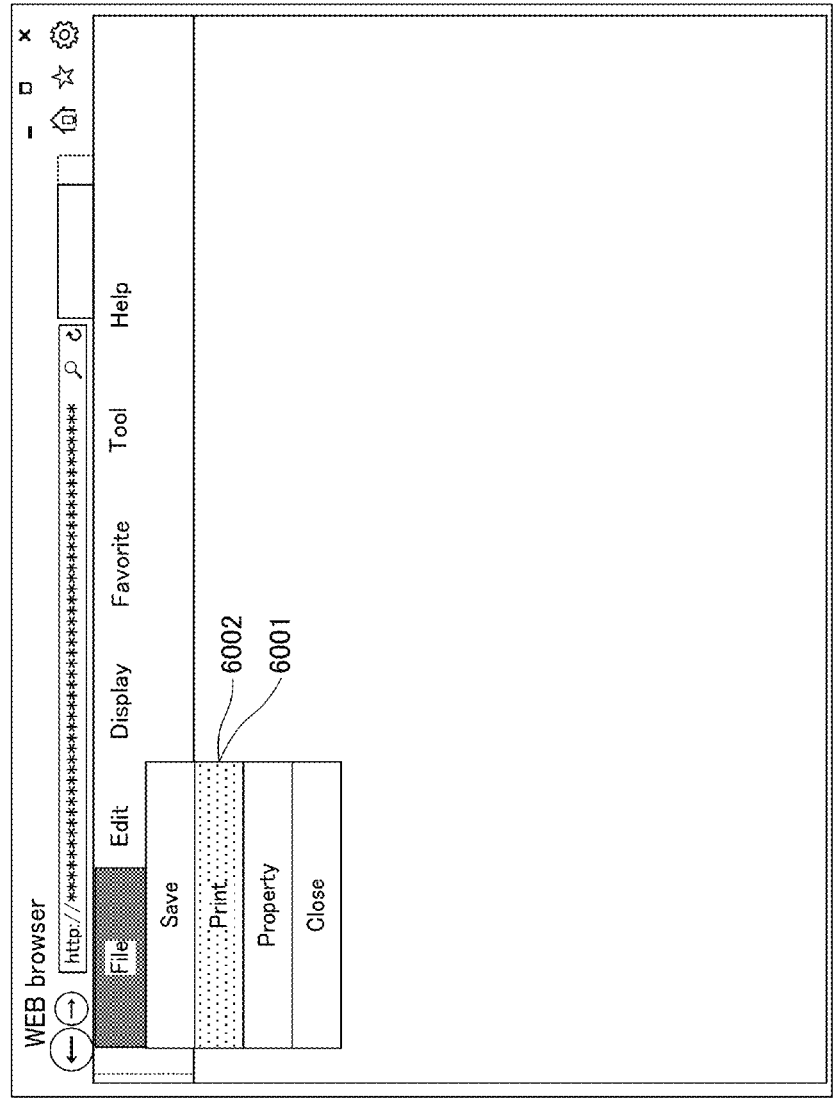
FIGS. 9A and 9B are diagrams illustrating an example of a desktop application screen and a print dialog screen.

FIGS. 9A, 9B, 10A, and 10B are diagrams illustrating examples of the desktop print setting UI to be operated by the OS 210. Using these drawings, the print process from the desktop UI will be described. FIG. 9A is a diagram illustrating an example of the desktop application 3003 to operate on the desktop. First, if the printing is performed from the desktop application 3003, an item 6002 of printing of a file menu 6001 is selected and the desktop application 3003 displays a print setting dialog 6100 illustrated in FIG. 9B as will be described below.

Figure 9B:
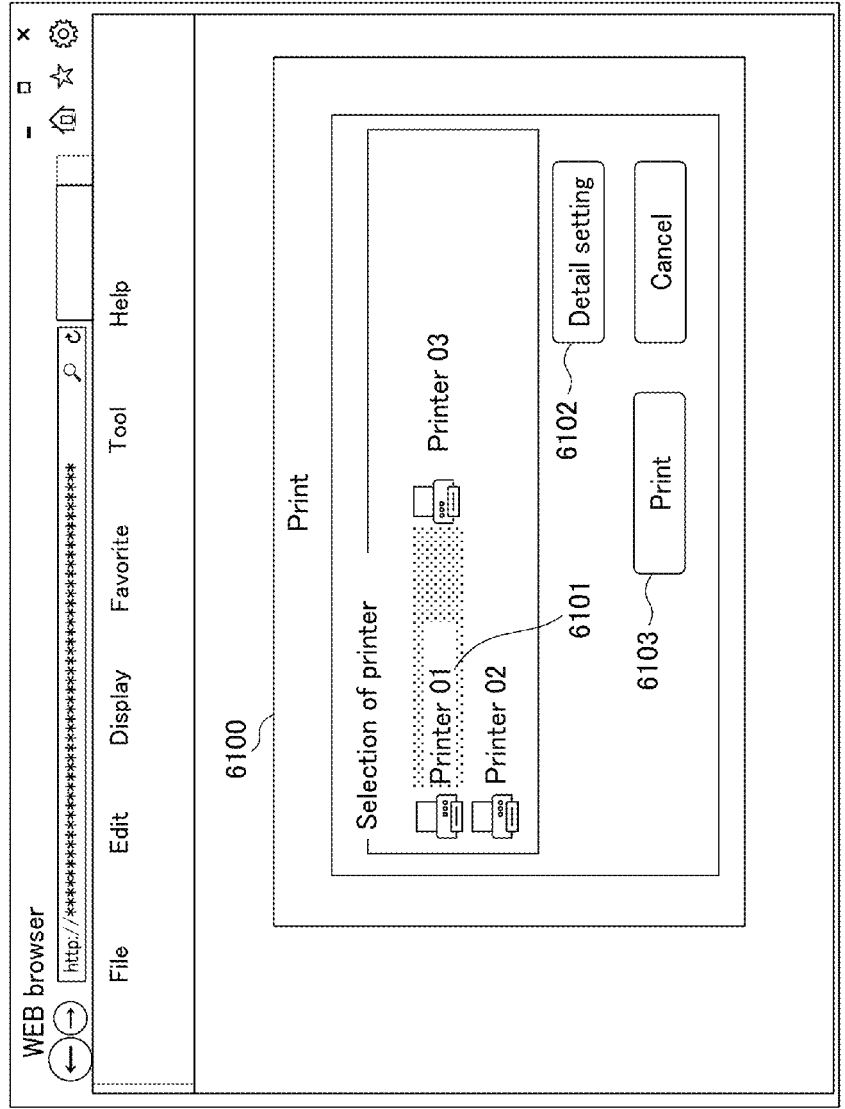

FIG. 9B is a diagram illustrating an example of the print dialog 6100. A printer name button 6101 for selecting a print queue of an output destination, a detail setting button 6102 for performing a detail setting on the print queue 3017 during the selection, and a print button 6103 for receiving print execution are disposed in the print dialog 6100. If the detail setting button 6102 is selected, the desktop application 3003 requests the OS 210 to provide the desktop print detail setting application 3005 corresponding to the print queue 3017 during the selection using the printer name button 6101.

Figure 10A:
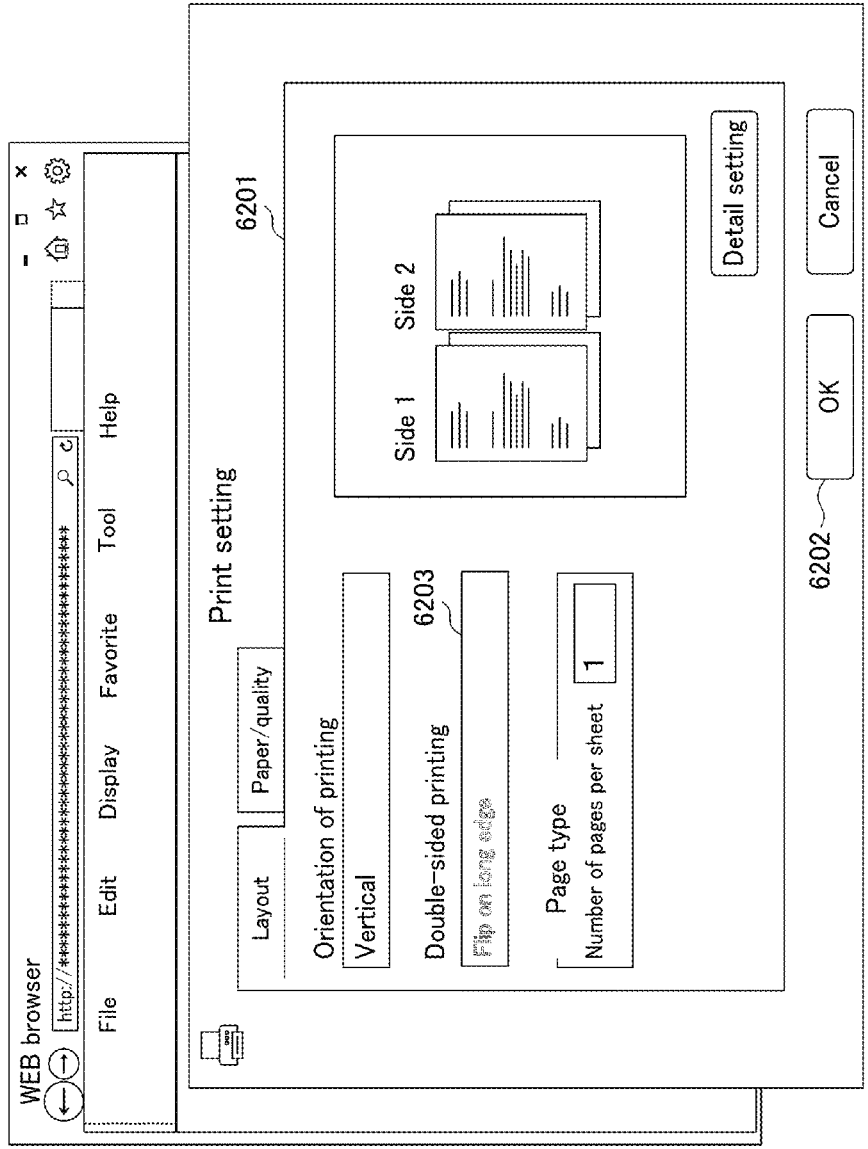
FIGS. 10A and 10B are diagrams illustrating examples of a detail setting application screen and a non-input popup screen.

FIG. 10A is a diagram illustrating an example of the desktop print detail setting application 3005. The OS 210 receives the request from the desktop application 3003 and displays the desktop print detail setting application 3005 corresponding to the printer 102 corresponding to the print queue 3017 during the selection. The desktop print detail setting application 3005 is an application for performing a print setting process related to the printer 102 and can set detailed print setting information related to printing for a printer.

In addition, the desktop print detail setting application 3005 has a print setting group 6201 and an OK button 6202 for establishing the print setting. The print setting group 6201 displays current print settings such as color printing, single- or double-sided printing, and secure print and further receives a change of a print setting. Also, the item set in the manager setting information 3501 is grayed out and displayed and may be configured so that it is difficult for the user to focus thereon. An item 6203 of the double-sided printing indicates that a setting change is disabled through the manager setting.

Figure 10B:
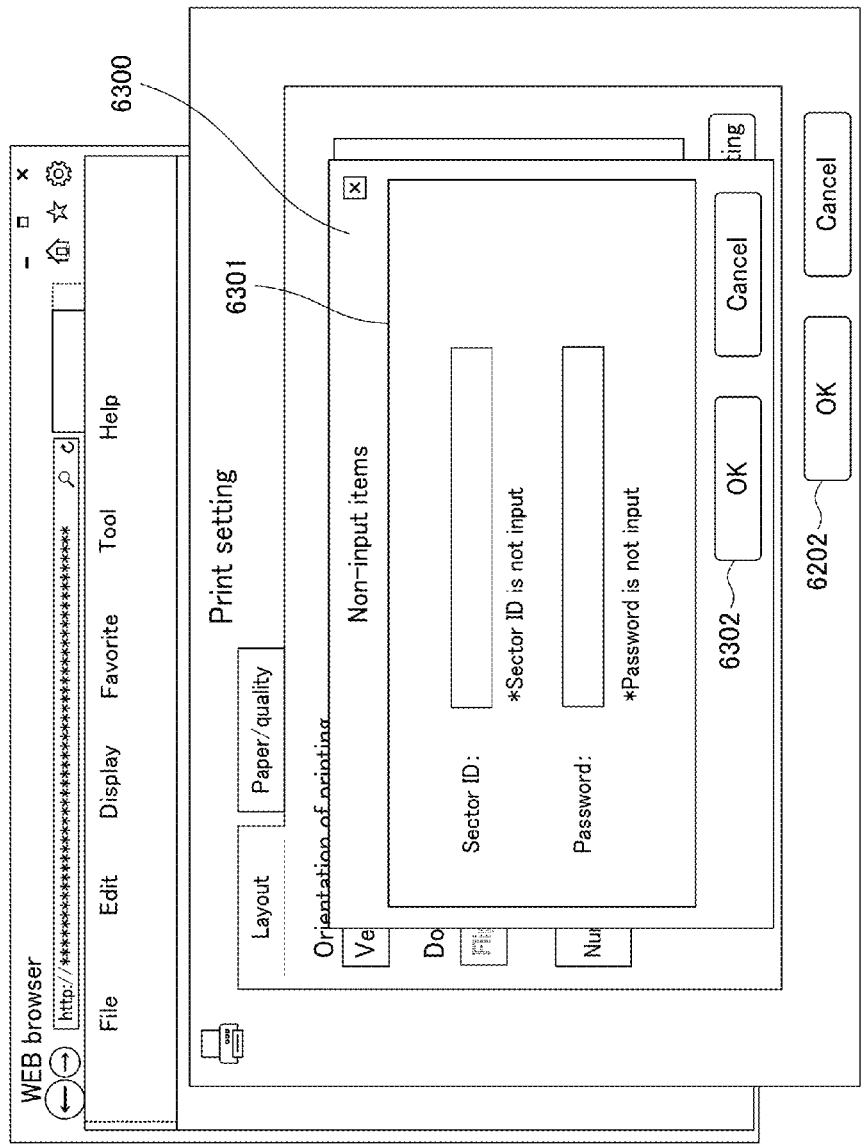

FIG. 10B is a diagram illustrating a non-input popup 630 for prompting to enter an input of a non-input item. The non-input popup 6300 is a popup for prompting to enter an input to the non-input item and has a non-input item group 6301 for displaying non-input items and an OK button 6302 for establishing an input value. Also, the non-input popup 6300 will be described below in detail using the flowchart illustrated in FIG. 11.

FIG. 11 is a flowchart illustrating a process of displaying the non-input popup from the display of the desktop print detail setting application 3005. Also, unless otherwise stated, this process is performed by the desktop print detail setting application 3005.

First, if the detail setting button 6102 of the print dialog 6100 is pressed, the print configuration 3007 acquires the print ticket 3100 and the print capability 3200 and activates the desktop print detail setting application 3005. In addition, if the desktop print detail setting application 3005 is activated, a value of the print ticket 3100 is reflected in an initial value.

Next, the desktop print detail setting application 3005 acquires the manager setting information 3501 from the queue property bag 3013 in an initialization step and displays the manager setting information 3501 on the desktop after internally holding the manager setting information 3501 (step S703). Then, if the desktop print detail setting application 3005 is displayed, an item for which a setting change is limited in the manager setting information 3501 is grayed out and displayed and configured so that it is difficult for the user to focus thereon (step S704).

Next, the desktop print detail setting application 3005 receives the user's operation (step S705) and receives an OK button 6202 for establishing print settings. Then, the desktop print detail setting application 3005 refers to manager setting information 3501 if the OK button 6202 is received and determines whether or not a setting requiring an input to a predetermined item is valid (step S706). Note that the setting requiring the input to the predetermined item described above is a sector-specific management function or secure print. In the manager setting information 3501, it is determined whether or not the sector-specific management function of the sector-specific management setting item 5007 or the secure print of the secure print setting item 5008 is valid.

If the setting requiring the input to the above-described predetermined item is valid (YES), the desktop print detail setting application 3005 determines whether or not a setting value of an item (essential input item) for which an input is necessary has yet to be input (step S707). If the setting value of the item (essential input item) for which the input is necessary has yet to be input (YES), the non-input popup is displayed (step S708) and the user is prompted to enter the input of the non-input item. Also, if both the sector-specific management function of the sector-specific management setting item 5007 and the secure print of the secure print setting item 5008 are valid, there may be an item for which a plurality of inputs are necessary. Therefore, if an input of an item for which the plurality of inputs are necessary is not input, a non-input popup is displayed a plurality of times so that all inputs of a non-input item can be entered.

Next, the desktop print detail setting application 3005 receives the user's operation for a non-input item (step S709). Then, if the OK button 6302 is received, the desktop print detail setting application 3005 determines whether or not an input value for the non-input item is valid (step S710). If the input value is invalid (NO), the desktop print detail setting application 3005 prompts the user to enter the input again.

On the other hand, if the input value is valid (YES), the desktop print detail setting application 3005 reflects the input value in the print ticket 3100 and the process proceeds to step S711. In addition, if the setting requiring an input for a predetermined item is invalid (NO) in step S706 and if a setting value of an item for which an input is necessary is input (NO) in step S707, the process proceeds to step S711. Then, the desktop print detail setting application 3005 transfers the print ticket 3101 to the print configuration 3007 (step S711). Then, the desktop print detail setting application 3005 and the non-input popup are closed (step S712).

Also, an input screen is displayed by the popup in this embodiment, but a display method including the transition to a tab of the input screen is not limited thereto. According to this embodiment, it is possible to prevent the user from forgetting an input by displaying a operation screen for prompting the user to enter an input to an item for which the input is necessary if the setting requiring the input for the predetermined item through the manager setting unintended by the user is performed.

FIGS. 12A to 12C and 13A to 13C are diagrams illustrating examples of a touch panel UI to be operated by the OS 210. Here, a print process from the touch panel UI will be described using FIGS. 12A to 12C and 13A to 13C. Also, the touch panel application 3004 has a design of a UI which places emphasis on a operation in a touch display. Thus, a operation menu is constituted of a button larger than a button provided in the desktop application 3003 so that the operation by a touch of a finger, a pen, or the like is facilitated. In addition, the touch panel application 3004 also receives a operation input of a mouse or a keyboard, but an example of a touch display operation will be described in this embodiment.

FIG. 12A is a diagram illustrating a start screen 8000 of the touch panel application 3004. The start screen 8000 is displayed on the entire surface on the touch display and the touch panel application 3004 is displayed in the format of a tile 8001. If the user taps the tile, a touch panel application corresponding to the tapped tile is displayed on the entire surface on the display.

Figure 12B:
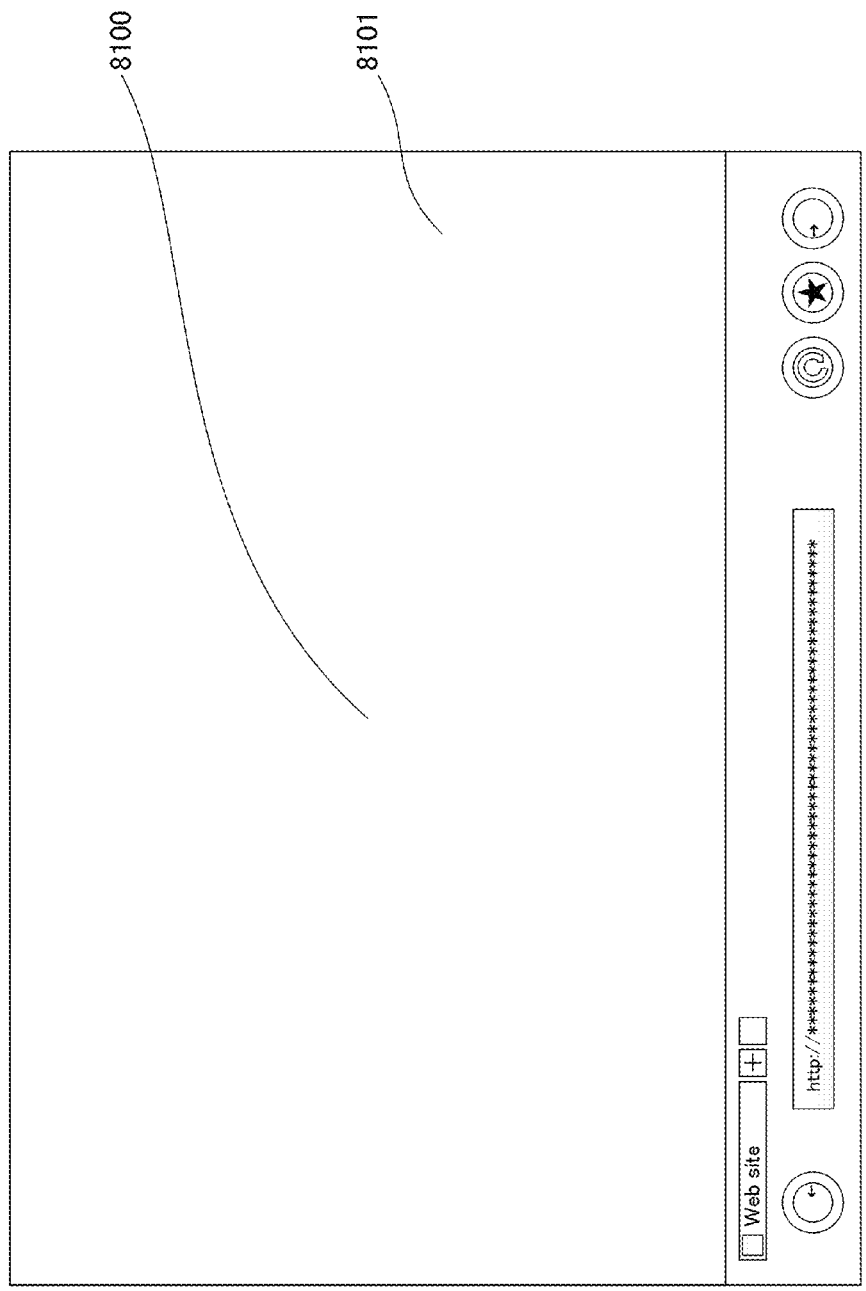

FIG. 12B is a diagram illustrating an example of the WEB browser 8100. The WEB browser 8100 is displayed on the entire surface of the touch panel display and no other application is displayed. If printing is performed using the touch panel application 3004, a menu screen called a charm 8200 illustrated in FIG. 12C is opened in a place of the display region 8101 by touching the touch display to cause a finger to slide thereon. There are a plurality of options in the charm 8200 and it is possible to further open a device menu 8201 which is a list of menus related to a device by tapping the device in the charm 8200.

Figure 13A:
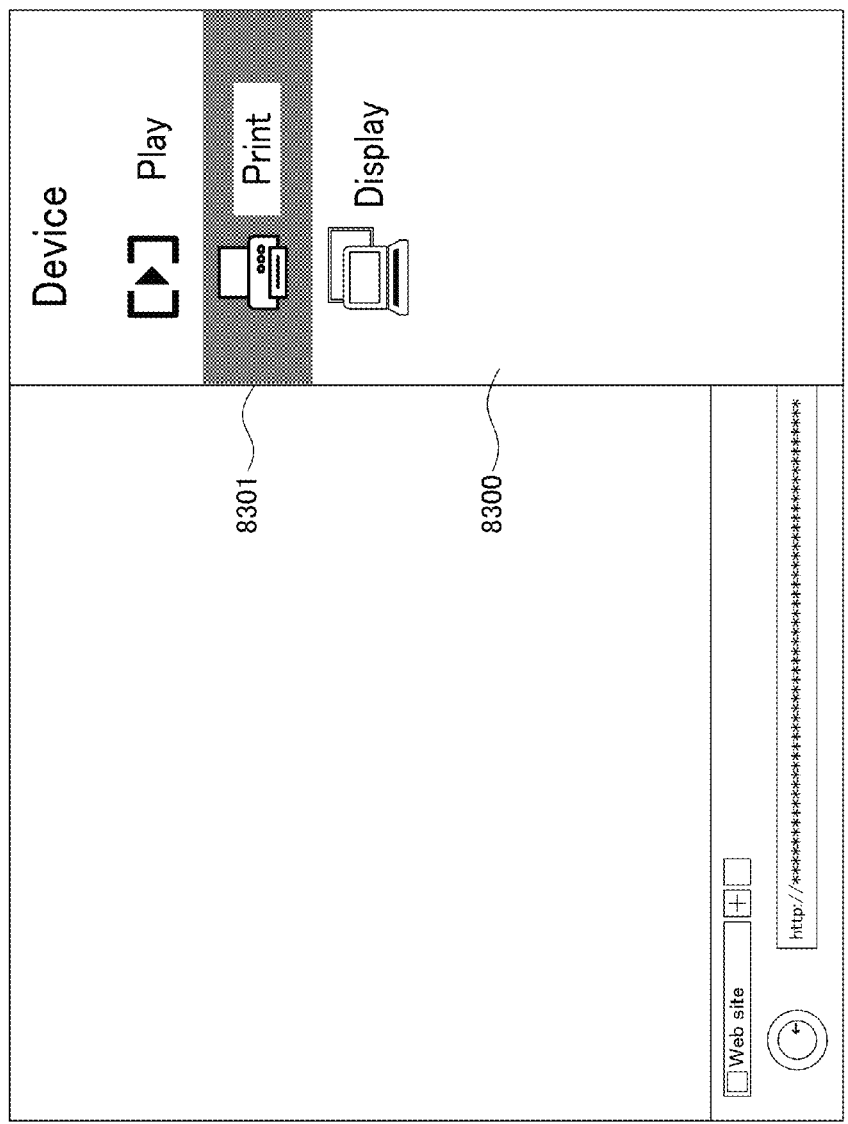
FIGS. 13A to 13C are diagrams illustrating examples of a print setting screen of a touch panel application.
Figure 13B:
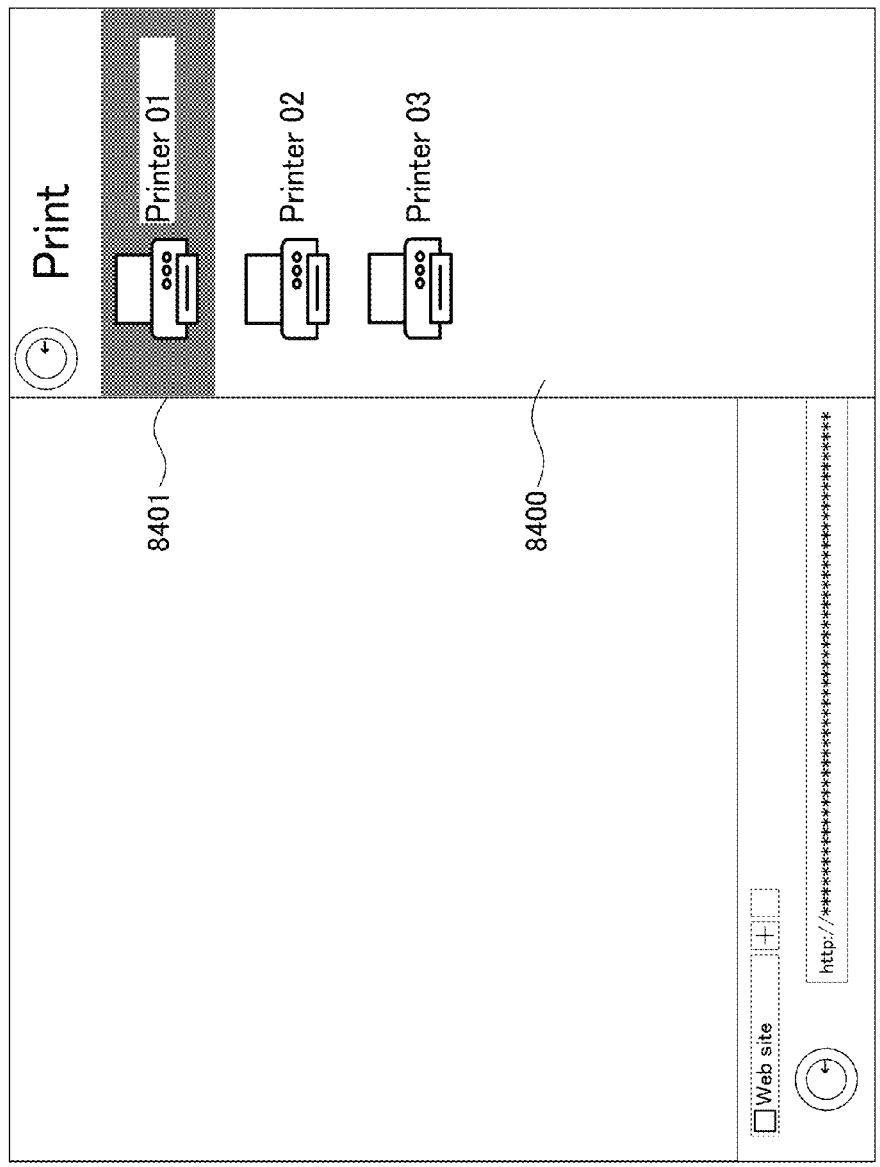
Figure 13C:
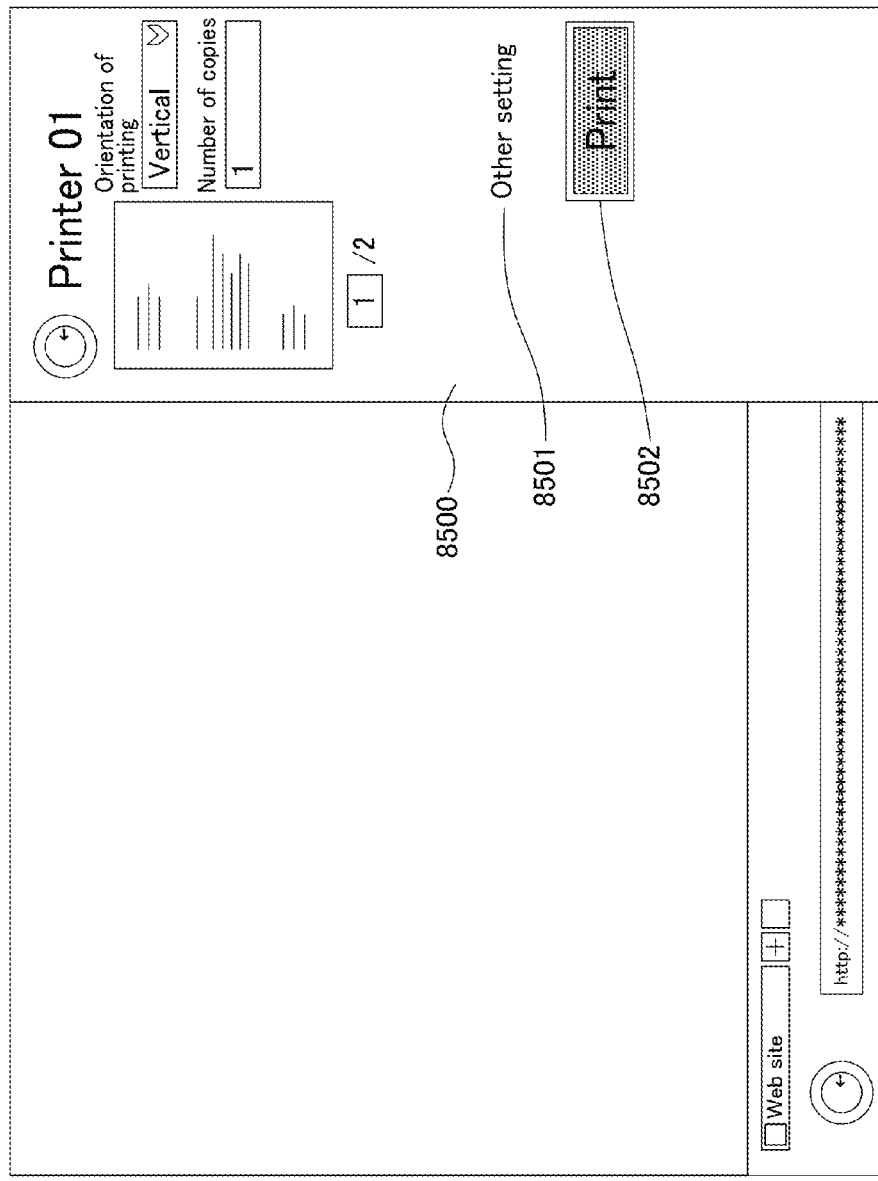

FIG. 13A is a diagram illustrating an example of a device menu. In the present embodiment, a device menu 8300 has a plurality of options such as reproduction, printing, and display. If printing 8301 is tapped, a print queue selection menu 8400 for selecting a print queue of a print output destination illustrated in FIG. 13B is displayed. In the print queue selection menu 8400, candidates for the print output destination are listed. Next, if an icon 8401 of "printer 01" which is a candidate for the print output destination is tapped, the basic print setting UI 8500 illustrated in FIG. 13C is displayed. In the basic print setting UI 8500, basic print setting information such as the number of copies and a color mode can be set.

If the detail setting (other setting) of the basic print setting UI 8500 is touched, the touch panel print detail setting application 3006 is displayed. The user can further perform a more detailed setting which is not included in basic settings. Also, this setting will be described below using FIGS. 14A, 14B, 15A, and 15B. After the setting is completed, the user taps a print button 8502, a PDL 3600 is created, and the printing is performed.

FIGS. 14A, 14B, 15A, and 15B are diagrams illustrating a touch panel print detail setting application 3006. Note that the touch panel print detail setting application 3006 serving as the target in this embodiment has a top page screen illustrated in FIG. 14A and a full-function setting screen illustrated in FIG. 14B including a setting screen including the setting of the sector-specific management function or the secure print.

Figure 14B:
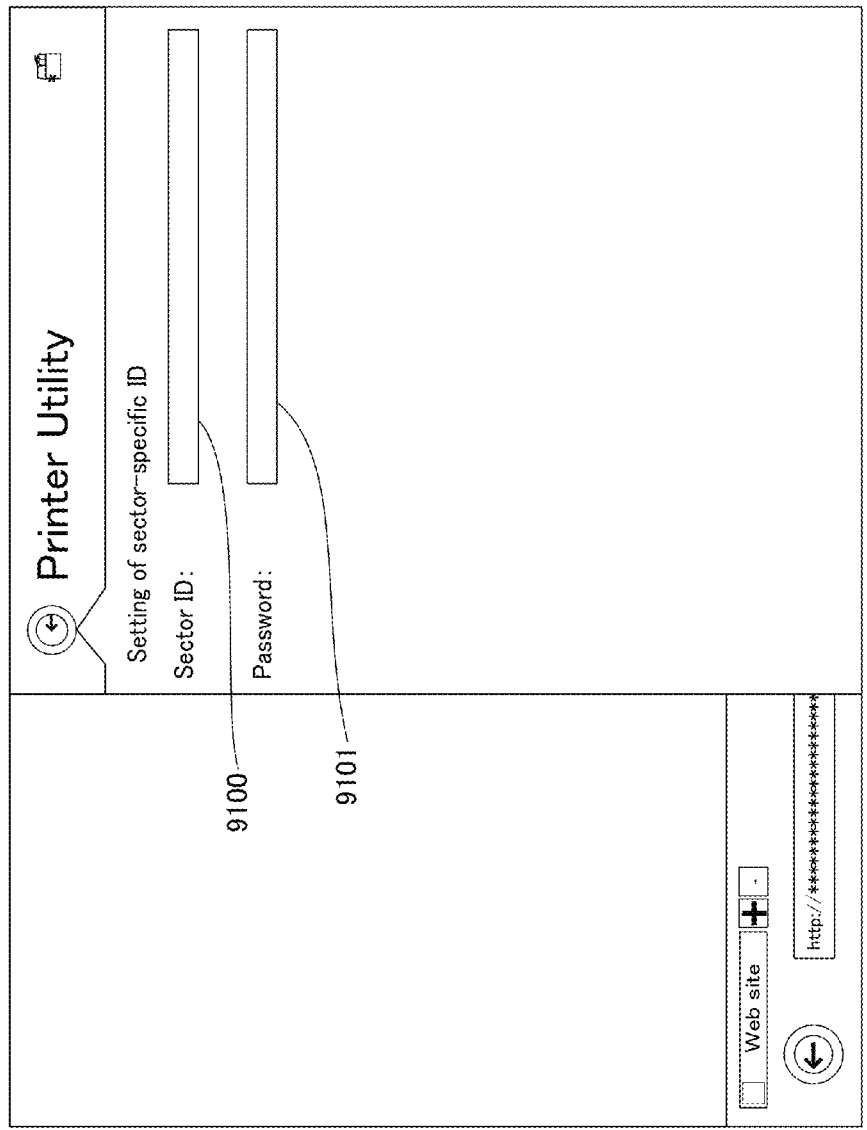

FIG. 14A is a diagram illustrating a top page screen. The top page screen is a collection of basic functions of the driver. In addition, the full-function setting screen is a collection of more detailed setting items. These screens can be moved by swiping the finger on the screen. In addition, the full-function setting screen is constituted of a plurality of sheets and the transition to the next sheet is possible one by one every time swiping is performed. The full-function setting screen will be described below in FIG. 14B.

The touch panel print detail setting application 3006 displays dot buttons 9002 in a lower region. The dot buttons 9002 equal in number to pages are displayed and page numbers are displayed on the dot buttons 9002. The user taps one of the dot buttons 9002 to perform the transition directly to a sheet of the page number corresponding to the dot button 9002.

In the top page screen and the full-function setting screen, an item for inputting a parameter to a device is present. In the present embodiment, each item is referred to as a setting item and a parameter input to the setting item is referred to as a setting value. In the present embodiment, an item 9003 for setting a paper orientation illustrated in FIG. 14A is a setting item and "double-sided/long edge" of the setting item 9003 is a setting value.

FIG. 14B is a diagram illustrating a sector-specific management function setting screen of a full-function setting screen. The sector-specific management function setting screen has a sector ID input field 9100 and a password input field 9101. In the setting items of the sector ID input field 9100 and the password input field 9101, a numeric value can be input by operating a control group of a toggle button, a text input, a spin button, etc.

Figure 15A:
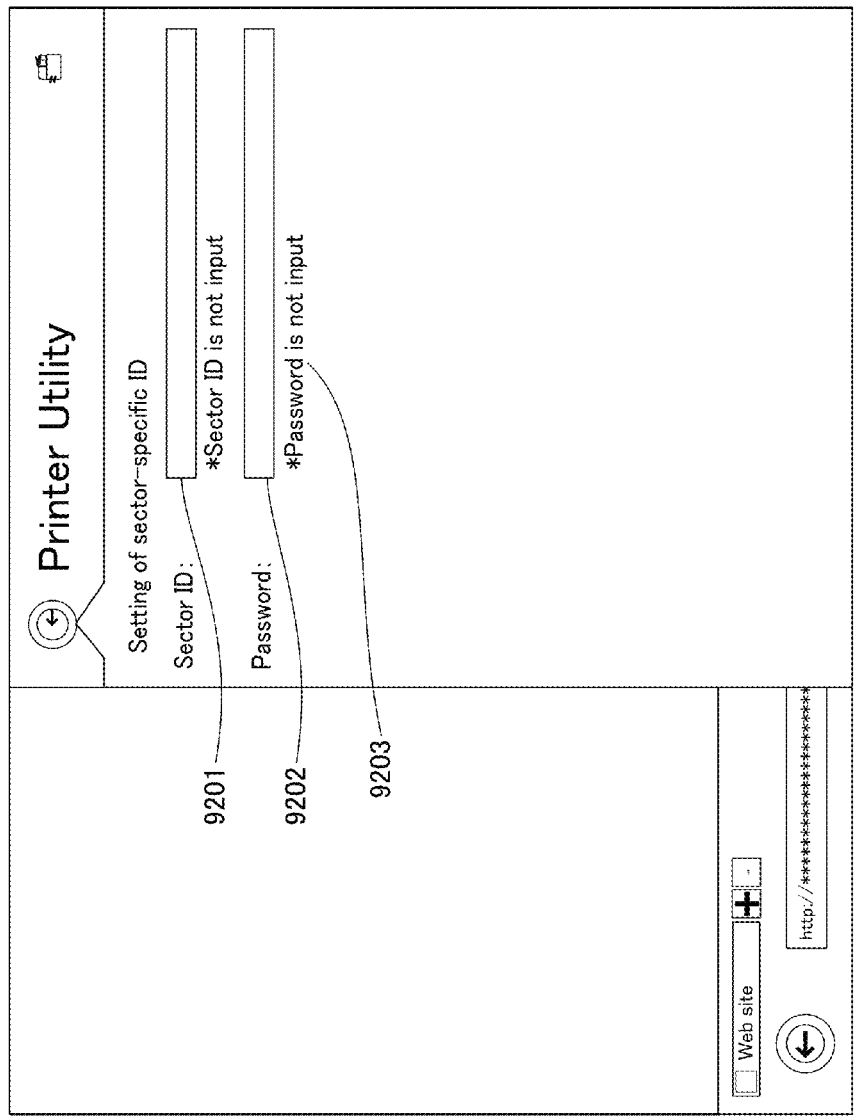
FIGS. 15A and 15B are diagrams illustrating examples of a non-input popup and a manager setting notification.

After the print setting ends, the print setting is established by tapping a return button 9001 and the screen transitions to the basic setting screen illustrated in FIG. 13. Next, FIG. 15A is a diagram illustrating a non-input popup displayed at the time at which the sector-specific management function is set in the manager setting application 3001 and the user does not enter an input if the return button 9001 is tapped. Note that FIG. 15A illustrates an example in which a sector ID and a password of the sector-specific management function are not input.

Figure 15B:
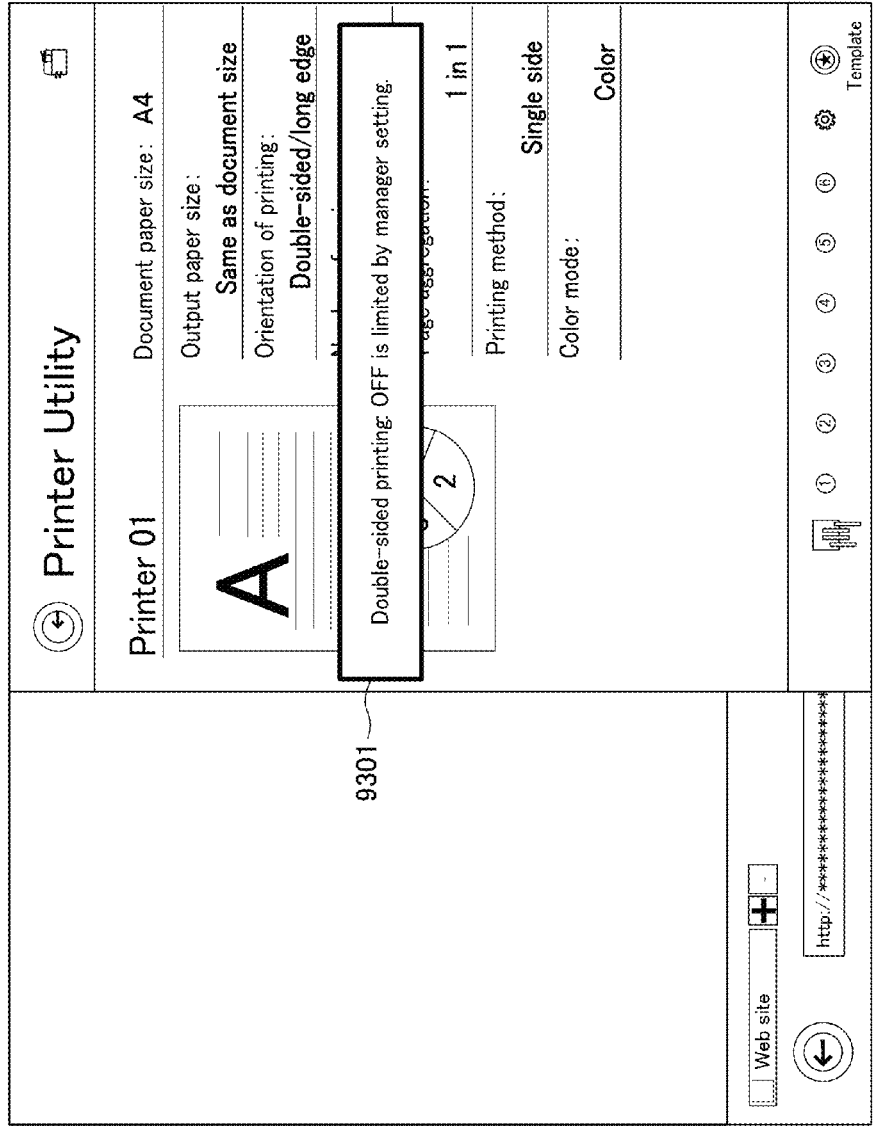

The non-input popup displays a non-input sector ID input field 9201, a non-input password input field 9202, and an annotation 9203 for prompting the user to enter an input. In addition, FIG. 15B is a diagram illustrating a manager setting notification. If a setting value for which a setting change is limited by the manager setting is intended to be changed, a manager setting notification 9301 is displayed. In the present embodiment, the double-sided printing is the setting value for which the setting change is limited through the manager setting and the manager setting notification 9301 is displayed if the setting is intended to be changed.

FIG. 16 is a flowchart illustrating a process of displaying a non-input popup after the display of the touch panel print detail setting application 3006. Note that unless otherwise stated, this process is performed by the touch panel print detail setting application 3006. First, a print configuration 3007 receives a request from a basic print setting UI 8500, acquires a print ticket 3102 and a print capability 3202, and activates the touch panel print detail setting application 3006.

Next, the touch panel print detail setting application 3006 reflects a value of the print ticket 3102 in an initial value and acquires manager setting information 3502 from the queue property bag 3013 in an initialization step (step S1003). The manager setting information 3502 is displayed on the touch panel after being held internally.

Next, the touch panel print detail setting application 3006 receives the user's operation (step S1005) and proceeds to step S1006 if the user's operation is received by the manager setting (setting change). Next, it is determined whether or not the setting limited by the manager setting has been changed by the user (step S1006). If the setting has been changed (Yes), the change of the setting by the user is rejected and the manager setting notification is displayed (step S1007). After the display of the manager setting notification, the process returns to step S1005. If an input of the user's operation is received outside the manager setting, the manager setting notification is closed. If the setting is not changed in step S1006 (No), the process returns to step S1005 and the user's operation is received again (step S1005).

On the other hand, if the user's operation received in step S1005 is a operation of an OK button (return button 9001) for establishing the print setting (OK), the process proceeds to step S1008. That is, if the operation of the OK button (return button 9001) is received, the touch panel print detail setting application 3006 refers to the manager setting information 3502 and checks whether or not the setting requiring an input to a predetermined item is valid (step S1008). Also, the setting requiring the input to the predetermined item described above is a sector-specific management function or the secure print. In the manager setting information 3502, it is determined whether or not the sector-specific management function of the sector-specific management setting item 5007 or the secure print of the secure print setting item 5008 is valid.

If the setting requiring the input to the predetermined item is valid (YES), the touch panel print detail setting application 3006 determines whether or not a setting value of an item for which the input is necessary is input (step S1009). If the setting value of the item for which the input is necessary is not input (YES), the non-input popup is displayed (step S1010) and the user is prompted to enter the input to the non-input item. Next, the operation from the user is received for the non-input popup (step S1011), the setting is established by tapping the return button 9001, and the process proceeds to step S1012 by reflecting an input value in the print ticket 3102. At this time, the setting is established even if the setting value of the item for which the input is necessary is not input. If the setting value of the item for which the input is necessary is input (NO) in step S1009, the process proceeds to step S1012.

In step S1008, the manager setting information 3502 is referenced. If the setting requiring the input to the predetermined item is invalid (NO), the process proceeds to step S1012. Note that the input screen is displayed by the popup in the present embodiment, but a display method including the transition to the tab of the input screen may be another method.

The print ticket 3103 is transferred to the print configuration 3007 (step S1012). Next, the touch panel print detail setting application 3006 and the non-input popup are closed (step S1013).

According to the present embodiment, it is possible to prevent the user from forgetting an input by displaying a operation screen for prompting the user to enter an input of an item for which the input is necessary if the setting requiring the input for the predetermined item through the manager setting unintended by the user is performed.

Second Embodiment

In the first embodiment, the example in which the operation screen for prompting the user to enter the input to the non-input item set through the manager setting is displayed has been shown. However, because a non-input popup is displayed a plurality of times if there are a plurality of non-input items and it is necessary to input a setting value in the first embodiment, usability deteriorates. For example, because it is necessary to individually set two types of a sector-specific management function and a secure print in an item requiring a password, it is necessary to perform display a plurality of times in order to display non-input popups. Therefore, a method of improving the user's operability by displaying a plurality of non-input items at a time will be described in the present embodiment.

Figure 17:
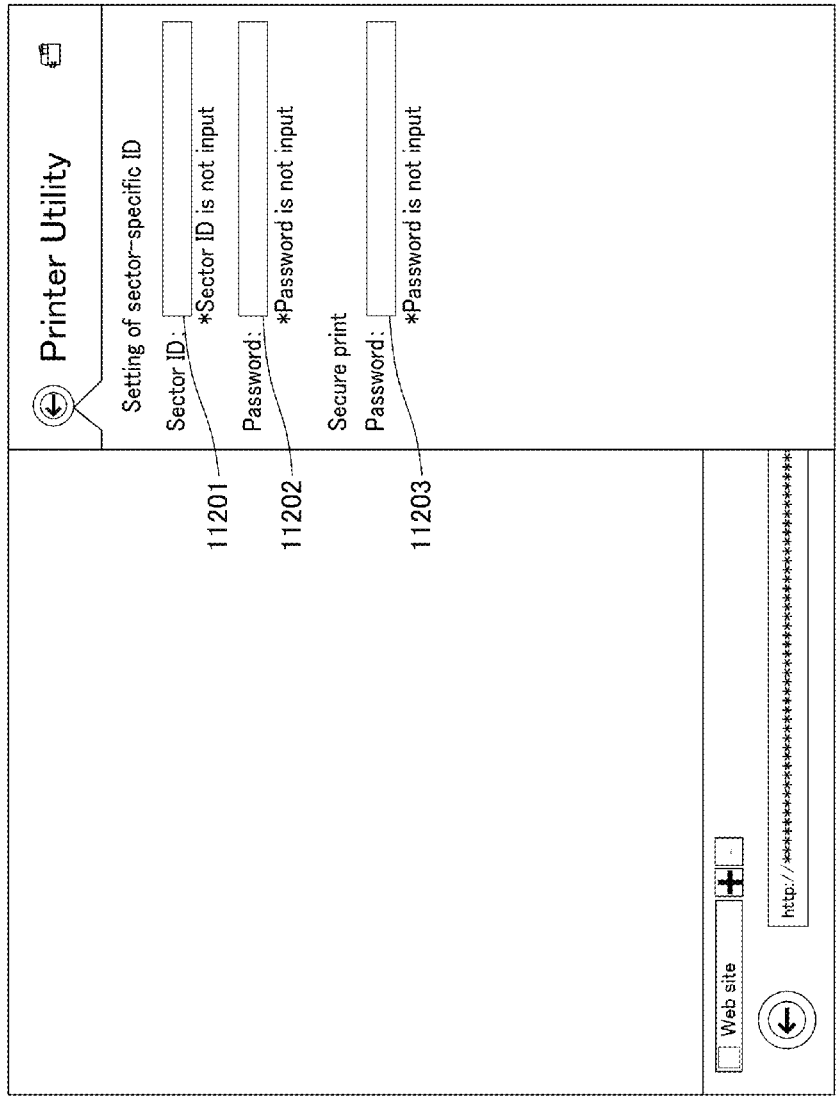
FIG. 17 is a diagram illustrating a popup of a non-input item of a touch panel application.
Figure 18:
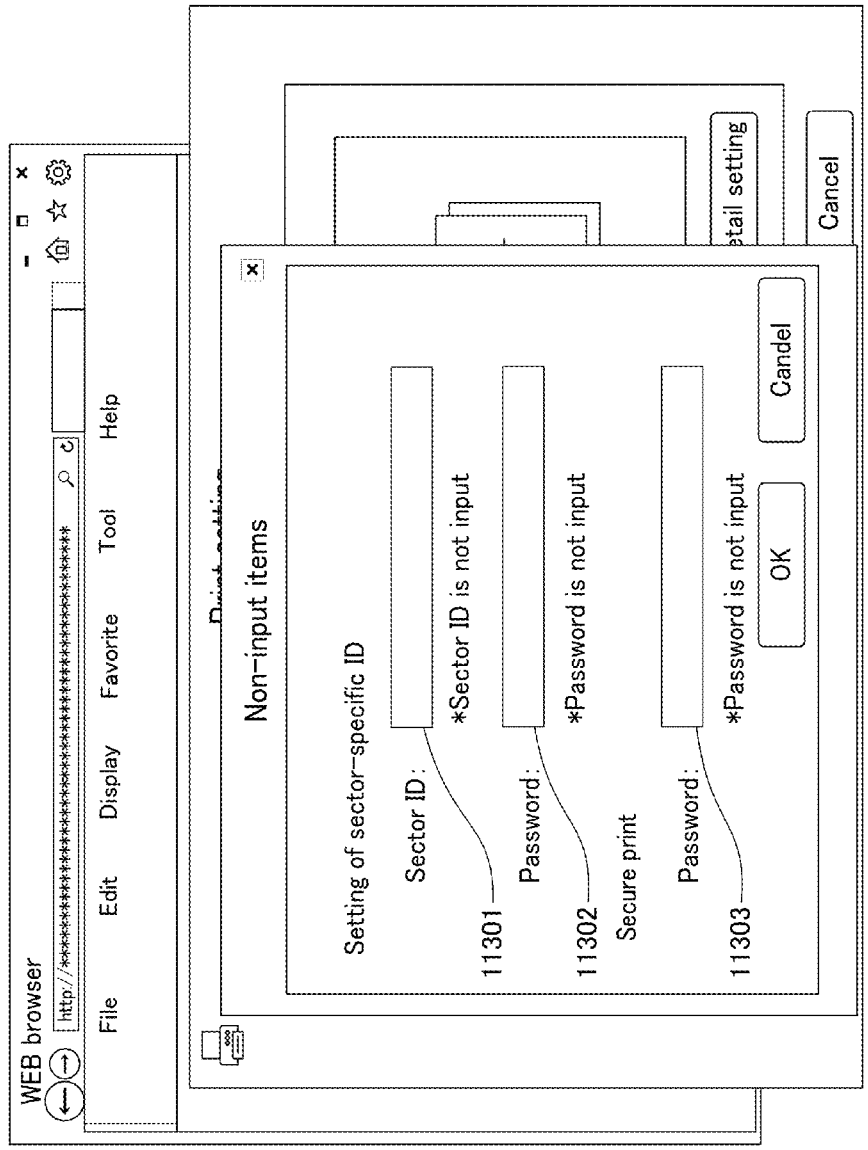
FIG. 18 is a diagram illustrating a popup of a non-input item of a desktop application.

FIGS. 17 and 18 are diagrams illustrating a non-input popup to be displayed if the sector-specific management function and the secure print are set in the manager setting information 3502 and an input to an item requiring the input is not entered. FIG. 17 is a diagram illustrating non-input popups of a plurality of items displayed from the touch panel print detail setting application 3006. The touch panel print detail setting application 3006 has a sector ID input field 11201, a sector-specific management function password input field 11202, and a secure print password input field 11203 for requesting an input in the sector-specific management function. An annotation for prompting the user to enter an input to each input field is attached.

FIG. 18 is a diagram illustrating non-input popups of a plurality of items displayed from the desktop print detail setting application 3005. The desktop print detail setting application 3005 has a sector ID input field 11301, a sector-specific management function password input field 11302, and a secure print password input field 11303 for requesting an input in the sector-specific management function. An annotation for prompting the user to enter an input to each input field is attached.

Figure 19:
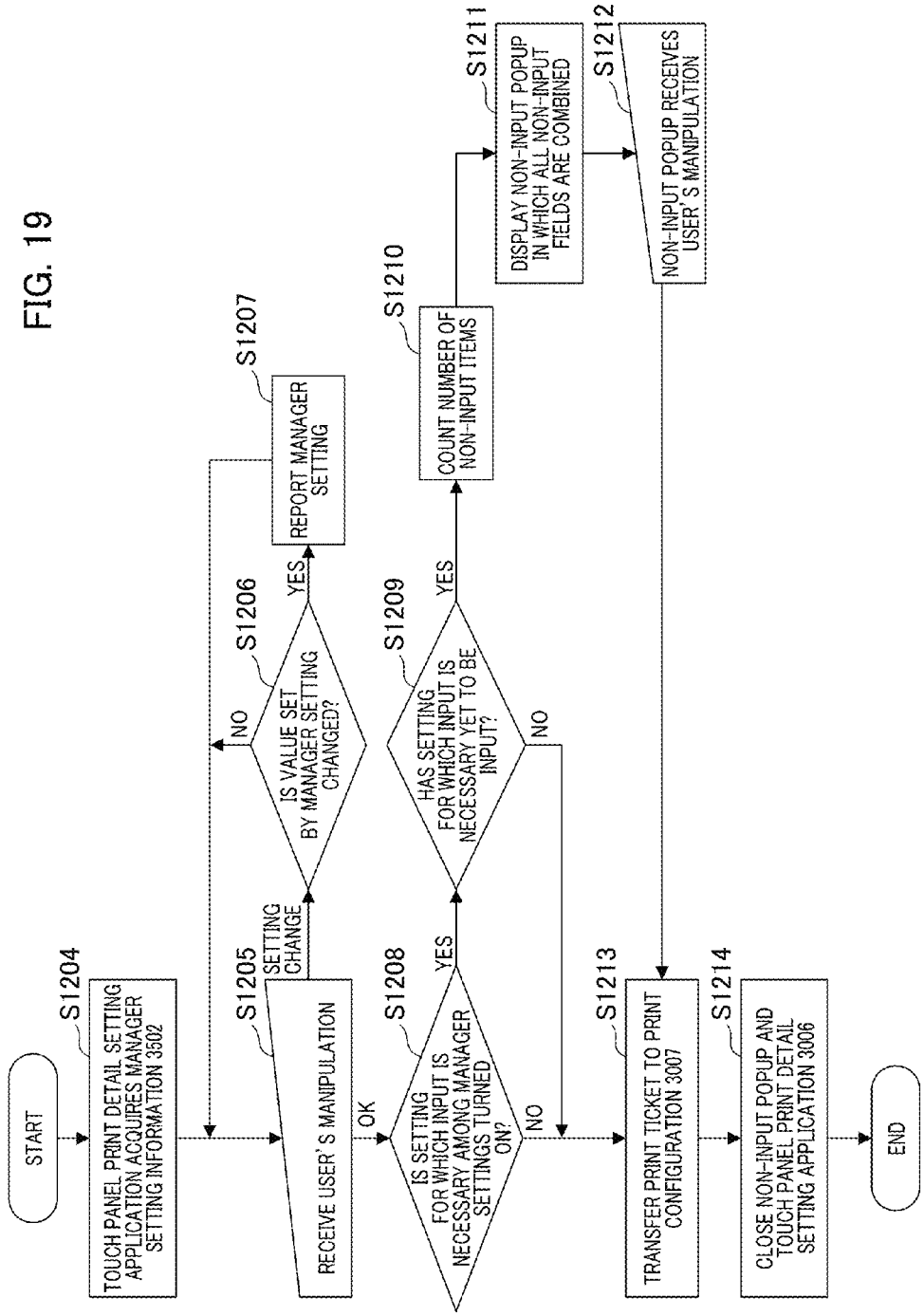
FIG. 19 is a flowchart illustrating a process of displaying a non-input item on a touch panel.

FIG. 19 is a flowchart illustrating a process in which the touch panel print detail setting application 3006 displays the non-input popups of the plurality of items. Also, the sector-specific management function and the secure print are assumed to be already set in the manager setting information 3502 as a premise. In addition, unless otherwise stated, this process is performed by the touch panel print detail setting application 3006. Note that, because the process of steps S1204 to S1209 illustrated in FIG. 19 is similar to the process of steps S1003 to S1009 illustrated in FIG. 16, detailed description thereof will be omitted.

If the setting requiring an input to a predetermined item is valid (YES) in step S1208, the touch panel print detail setting application 3006 determines whether or not a setting value for which an input is necessary is input (step S1209).

Note that a specific determination process is similar to the determination process of step S1008 illustrated in FIG. 16.

If the setting value for which the input is necessary is not input (YES) (step S1209), the number of non-input setting items is counted (calculated) (step S1210). The user is prompted to enter inputs for all the non-input items by creating a non-input popup in which all the non-input items are combined and displaying the created non-input popup on one screen (step S1211). Next, a operation from the user is received for the non-input popup (step S1212). The setting is established by tapping the return button 9001, the input value is reflected in the print ticket 3100, and the process proceeds to step S1213. At this time, the setting is established even if the setting value of the item for which the input is necessary is not input. If the setting value of the item for which the input is necessary is input (NO) in step S1209, the process proceeds to step S1213.

In step S1208, the manager setting information 3502 is referenced. If the setting requiring the input to the predetermined item is invalid (NO), the process proceeds to step S1213. Note that, in the present embodiment, although the input screen is displayed by the popup, a display method including the transition to the tab of the input screen may be another method.

The print ticket 3100 is transferred to the print configuration 3007 (step S1213). Next, the touch panel print detail setting application 3006 and the non-input popup are closed (step S1214). According to the above process, it is possible to prevent an input for an essential input item from being forgotten and improve operability for the user by displaying a plurality of non-input items at a time.

Figure 20:
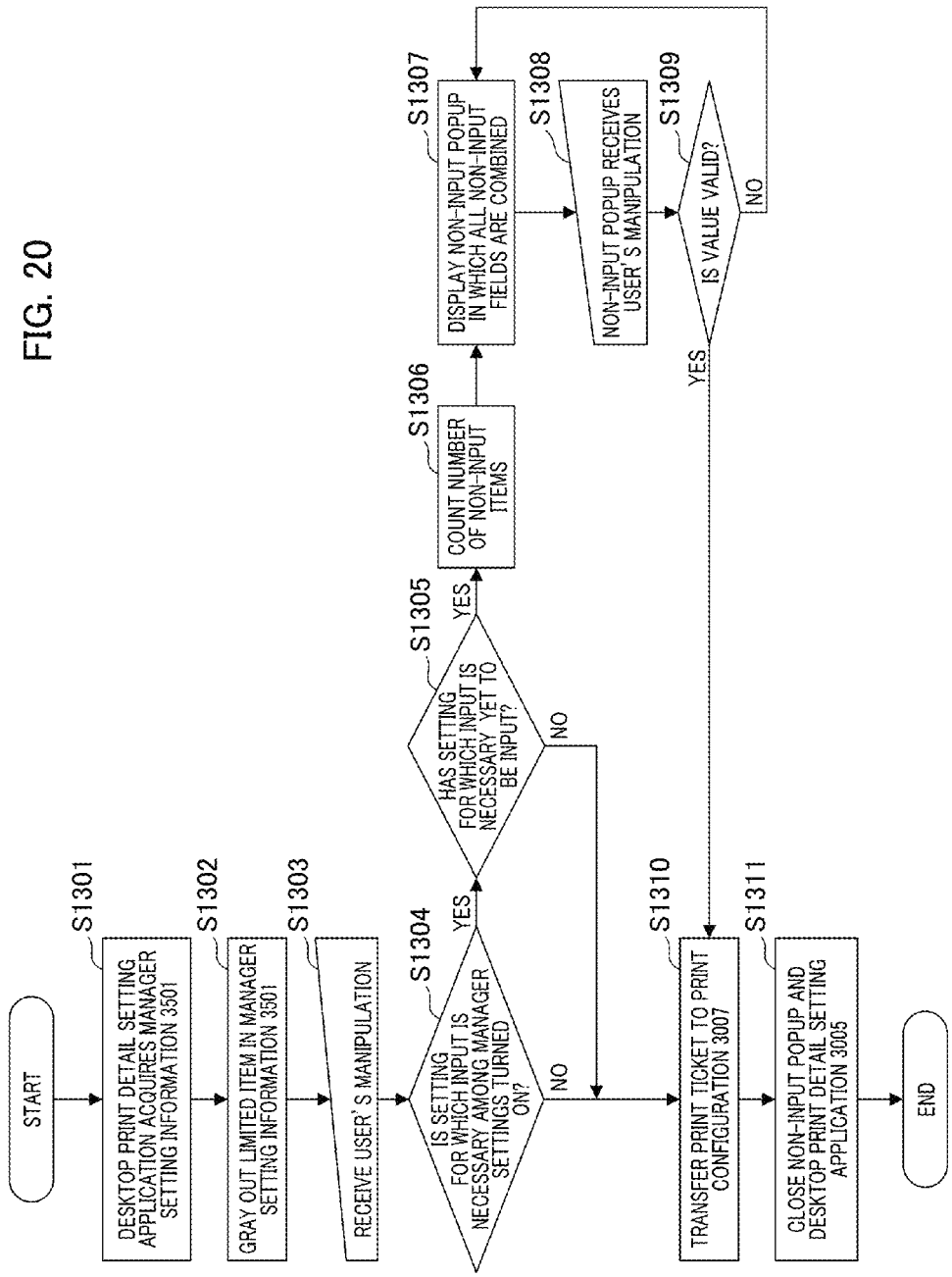
FIG. 20 is a flowchart illustrating a process of displaying a non-input item in a desktop.

FIG. 20 is a flowchart illustrating a process in which the desktop print detail setting application 3005 displays non-input popups of a plurality of items on one screen. Note that the sector-specific management function and the secure print are assumed to be already set in the manager setting information 3501 as a premise. Also, unless otherwise stated, this process is performed by the desktop print detail setting application 3005.

First, the print configuration 3007 receives a request of the detail setting button 6102 of the print dialog, acquires the print ticket 3100 and the print capability 3200, and activates the desktop print detail setting application 3005. In addition, if the desktop print detail setting application 3005 is activated, a value of the print ticket 3100 of the print detail setting is reflected in an initial value.

Next, the desktop print detail setting application 3005 acquires the manager setting information 3501 from the queue property bag 3013 in an initialization step (step S1301) and displays the manager setting information 3501 on the desktop after internally holding the manager setting information 3501. Next, if the display is performed on the desktop, an item for which a setting change is limited in the manager setting information 3501 is grayed out and displayed and configured so that it is difficult for the user to focus thereon (step S1302).

Next, the desktop print detail setting application 3005 receives the user's operation (step S1303) and receives an OK button 6202 for establishing print settings. At this time, the desktop print detail setting application 3005 refers to manager setting information 3501 and determines whether or not a setting requiring an input to a predetermined item is valid (step S1304). Note that the specific determination process is similar to the determination process of S706 illustrated in FIG. 11.

If the setting requiring the input to the predetermined item is valid (YES), the desktop print detail setting application 3005 determines whether or not a setting value of an item for which an input is necessary is input (step S1305). If the setting value of the item for which the input is necessary is not input (YES), the number of non-input items is counted (step S1306). After the count, a non-input popup in which all non-input items are connected is displayed (step S1307) and the user is prompted to enter an input to the non-input items. If the setting value of the item for which the input is necessary is input (NO) in step S1305, the process proceeds to step S1310.

Next, the desktop print detail setting application 3005 receives the user's operation for a non-input item (step S1308). Then, if the OK button is received, the desktop print detail setting application 3005 determines whether or not an input value for the non-input item is valid (step S1309). If the input value is valid (YES) (step S1309), the desktop print detail setting application 3005 reflects the input value in the print ticket 3100 and proceeds to step S1310. On the other hand, if the input value is invalid (NO), the desktop print detail setting application 3005 displays the non-input popup again and prompts the user to enter the input again by returning to step S1307.

In step S1304, the manager setting information 3501 is referenced. If the setting requiring an input to a predetermined item is invalid (No), the process proceeds to step S1310. Then, the print ticket 3100 is transferred to the print configuration 3007 (step S1310). Then, the desktop print detail setting application 3005 and the non-input popup are closed (step S1311).

Note that, although the input screen is displayed by the popup in the present embodiment, a display method including the transition to the tab of the input screen may be another method. According to the present embodiment, it is possible to prevent the user from forgetting an input by displaying a operation screen for prompting the user to enter an input of an item for which the input is necessary if the setting requiring the input for the predetermined item through the manager setting unintended by the user is performed.

Third Embodiment

In the first embodiment the example in which an operation screen for prompting the user to enter an input is displayed if the input is not entered to an item for which the input set through the manager setting is necessary has been shown. However, in the first embodiment, the user needs to enter the same input many times every time the user performs printing, and thus usability deteriorates. Therefore, a method of saving a value input in the non-input popup as the default setting will be described.

Figure 21:
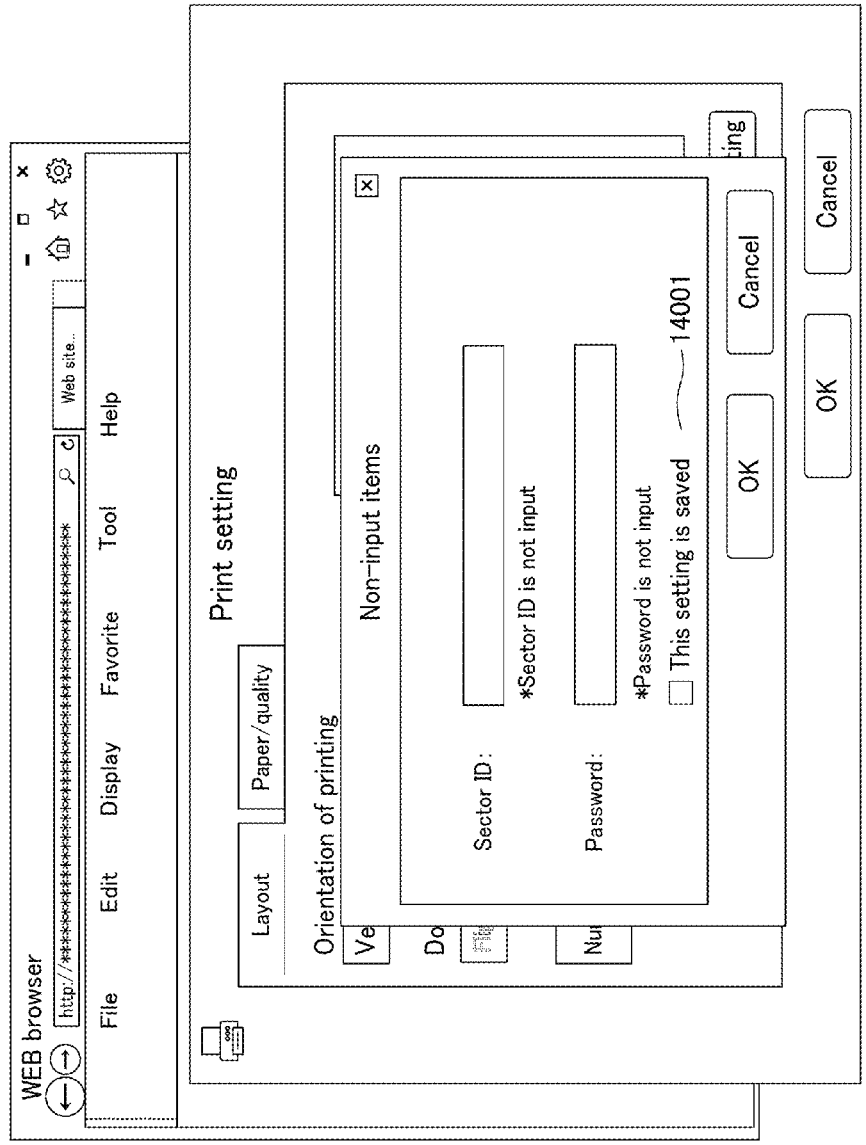
FIG. 21 is a diagram illustrating an example of a popup for saving a default setting.

FIG. 21 is a diagram illustrating the non-input popup in which the input value (input content) can be saved as the default setting. It is possible to save a value input in the non-input popup as the user default setting by checking a default saving check box 14001.

Figure 22:
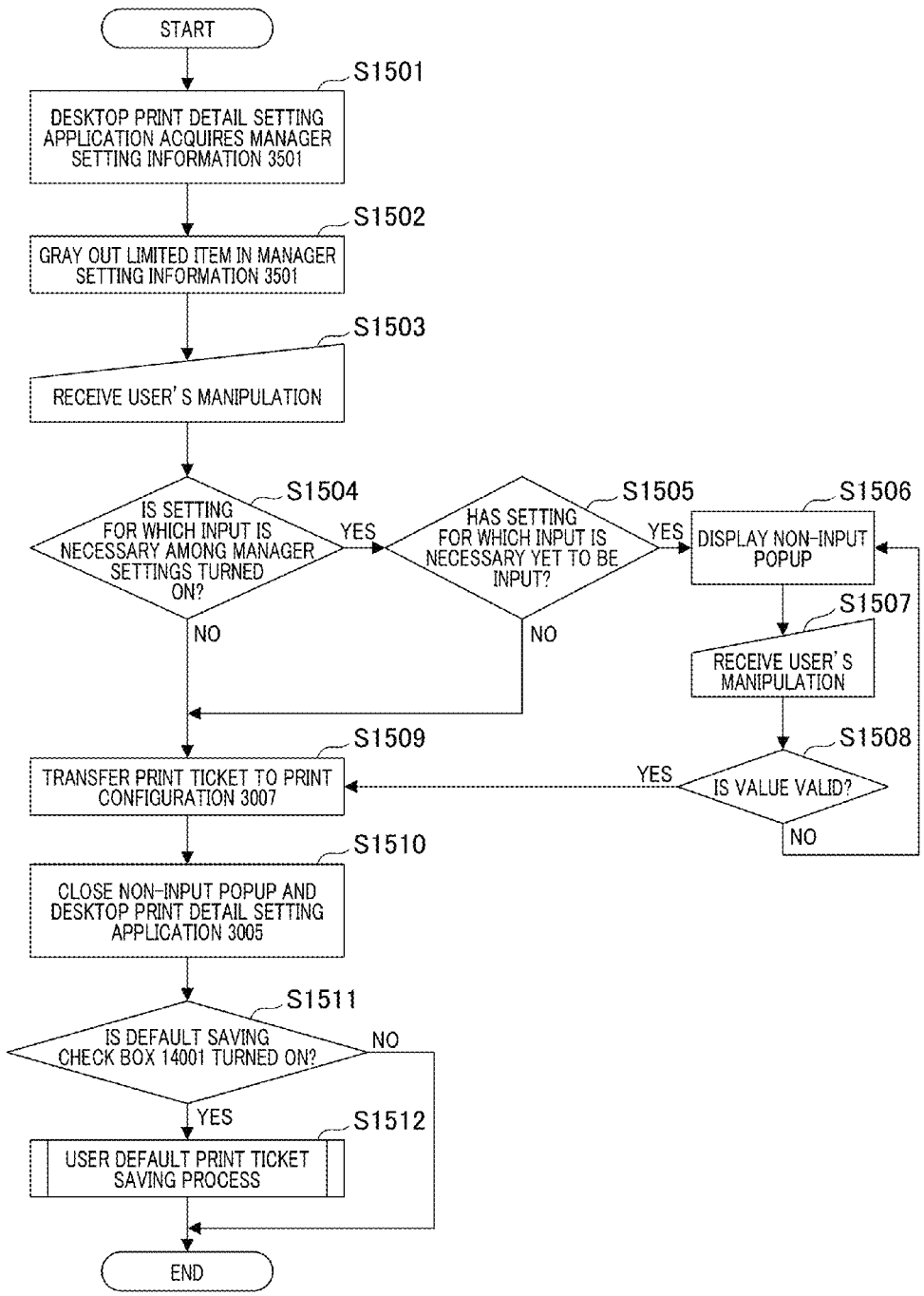
FIG. 22 is a flowchart illustrating a process of saving an input value of a popup.
Figure 23:
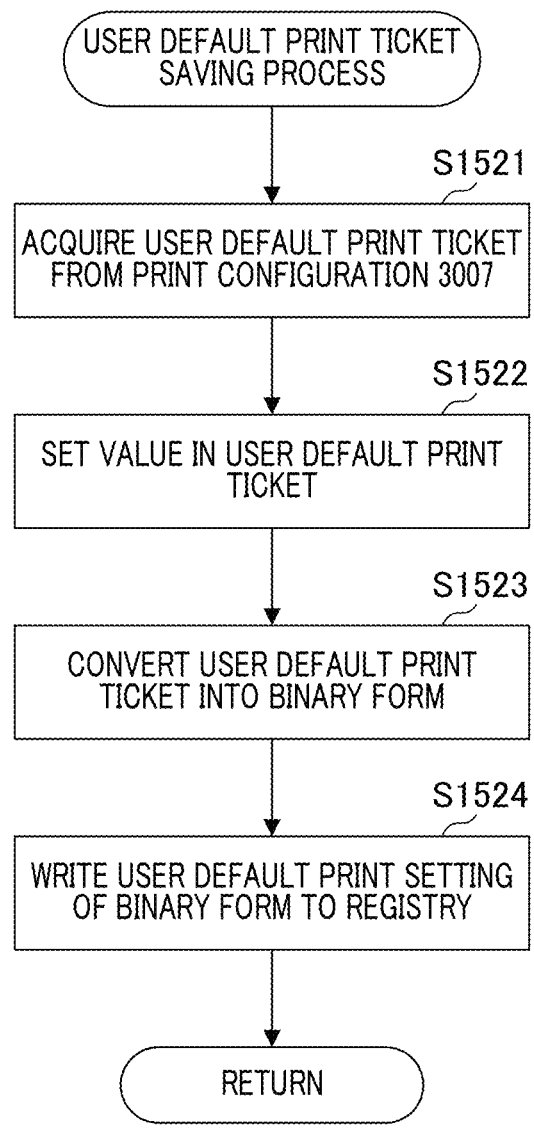
FIG. 23 is a flowchart illustrating a process of saving a default print setting.

Next, FIGS. 22 and 23 are flowcharts illustrating a process of saving the value input in the non-input popup as the default setting. Note that, unless otherwise stated, this process is performed by the desktop print detail setting application 3005. Also, because the process of steps S1501 to S1510 illustrated in FIG. 22 is similar to the process of steps S703 to S712 illustrated in FIG. 11, detailed description thereof will be omitted.

The desktop print detail setting application 3005 determines whether or not the default saving check box 14001 is valid if the non-input popup is closed (step S1511). If the default saving check box 14001 is turned on (YES), a user default print ticket saving process is performed (step S1512). On the other hand, if the default saving check box 14001 is turned off (NO), the process ends. Also, in this embodiment, the user default print ticket is a print ticket to which a default print setting of the user is written and the content of the print setting is written to the registry 3015 in a binary format.

FIG. 23 is a flowchart illustrating the user default print ticket saving process. First, the desktop print detail setting application 3005 acquires the user default print ticket from the print configuration 3007 (step S1521). Next, the value input in the non-input popup is set in the user default print ticket (step S1522).

After the input value input in the non-input popup is set, the user default print ticket is converted into a binary form (step S1523) and the binary type user default ticket is written to the registry 3015 (step S1524).

According to the present embodiment, it is possible to improve operability for the user because it is not necessary to display a non-input popup many times every time printing is performed and enter an input to an essential input item.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-247107, filed Dec. 5, 2014, and Japanese Patent Application No. 2015-103652, filed May 21, 2015, which are hereby incorporated by reference wherein in their entirety.

What is claimed is:

1. An information processing apparatus having a first execution environment and a second execution environment, comprising:
   one or more processors; and
   at least one memory coupled to the one or more processors, the at least one memory having instructions stored thereon which, when executed by the one or more processors, cause the information processing apparatus to:
   perform a manager setting requiring an input to a predetermined item of a print setting;
   execute a first print setting application on the first execution environment; and
   execute a second print setting application on the second execution environment,
   wherein, if the manager setting is performed requiring the input to the predetermined item of the print setting and there is no input to the predetermined item requiring the input, the first print setting application and the second print setting application display a screen for prompting the input to the predetermined item.

2. The information processing apparatus according to claim 1, wherein, if there is a plurality of predetermined items, the first print setting application and the second print setting application display all items to be displayed on one screen.

3. The information processing apparatus according to claim 2, wherein the first print setting application and the second print setting application change the number of items to be displayed according to the number of the plurality of predetermined items.

4. The information processing apparatus according to claim 3, wherein the number of items to be displayed by the first print setting application and the second print setting application is a number of non-input items among the plurality of predetermined items.

5. The information processing apparatus according to claim 1, wherein the instructions, when executed by the one or more processors, further cause the information processing apparatus to:
   input to the predetermined item; and
   save the manager setting,
   wherein the saving includes saving input content input to a non-input item in the inputting, and
   wherein, if a next printing is executed, the first print setting application and the second print setting application input the input content saved in the saving to the predetermined item in advance and display the input content.

6. A method of controlling an information processing apparatus having a first execution environment and a second execution environment, the method comprising:
   performing a manager setting requiring an input to a predetermined item of a print setting; executing a first print setting application on the first execution environment; and executing a second print setting application on the second execution environment;
   wherein, if the manager setting is performed requiring the input to the predetermined item of the print setting and there is no input to the predetermined item requiring the input, the first print setting application and the second print setting application display a screen for prompting the input to the predetermined item.

7. The method of controlling the information processing apparatus according to claim 6, wherein, if there is a plurality of predetermined items, the first print setting application and the second print setting application display all items to be displayed on one screen.

8. The method of controlling the information processing apparatus according to claim 7, wherein the first print setting application and the second print setting application change the number of items to be displayed according to the number of the plurality of predetermined items.

9. The method of controlling the information processing apparatus according to claim 8, wherein the number of items to be displayed by the first print setting application and the second print setting application is a number of non-input items among the plurality of predetermined items.

10. The method of controlling the information processing apparatus according to claim 6, further comprising:
    inputting to the predetermined item; and
    saving the manager setting,
    wherein the saving includes saving input content input to a non-input item in the inputting, and
    wherein, if a next printing is executed, the first print setting application and the second print setting application input the input content saved in the saving to the predetermined item in advance and display the input content on the screen.

11. A non-transitory storage medium storing a computer program for causing a computer to execute a method of controlling an information processing apparatus having a first execution environment and a second execution environment, the method including: performing a manager setting requiring an input to a predetermined item of a print setting; executing a first print setting application on the first execution environment; and executing a second print setting application on the second execution environment,
    wherein, if the manager setting is performed requiring the input to the predetermined item of the print setting and there is no input to the predetermined item requiring the input, the first print setting application and the second print setting application display a screen for prompting the input to the predetermined item.

* * * * *